(12) United States Patent
Zheng

(10) Patent No.: US 8,737,670 B2
(45) Date of Patent: May 27, 2014

(54) BUILT-IN TELESCOPIC EARPHONE STRUCTURE AND TERMINAL DEVICE

(76) Inventor: Daqing Zheng, Xinjiang (CN)

(*) Notice: Subject to any disclaimer, the term of this patent is extended or adjusted under 35 U.S.C. 154(b) by 54 days.

(21) Appl. No.: 13/287,406

(22) Filed: Nov. 2, 2011

(65) Prior Publication Data

US 2012/0114162 A1 May 10, 2012

(30) Foreign Application Priority Data

Nov. 4, 2010 (CN) .......................... 2010 1 0531882
Jun. 1, 2011 (CN) .......................... 2011 1 0146354
Jun. 1, 2011 (CN) ...................... 2011 2 0181417 U

(51) Int. Cl.
*H04R 25/00* (2006.01)

(52) U.S. Cl.
USPC .......................................... 381/384; 381/370

(58) Field of Classification Search
USPC .......... 381/370, 371, 374, 375, 384; 379/438, 379/451; D14/200–250
See application file for complete search history.

(56) References Cited

U.S. PATENT DOCUMENTS

| | | | |
|---|---|---|---|
| 5,511,120 A | 4/1996 | Hirata et al. | |
| 6,374,126 B1* | 4/2002 | MacDonald et al. | 455/569.1 |
| 7,515,706 B2* | 4/2009 | Park | 379/430 |
| 7,546,969 B2* | 6/2009 | Kuramoto | 242/388.1 |
| 7,599,509 B2* | 10/2009 | Ito | 381/384 |
| 8,080,734 B2* | 12/2011 | Mukai et al. | 174/102 R |
| 8,350,533 B2* | 1/2013 | Tam et al. | 320/150 |
| 2006/0013429 A1* | 1/2006 | Ohta | 381/370 |
| 2006/0035684 A1* | 2/2006 | Guo | 455/575.1 |
| 2008/0026356 A1* | 1/2008 | Kagan | 434/322 |
| 2010/0193221 A1* | 8/2010 | Schoeffmann et al. | 174/135 |
| 2011/0044487 A1* | 2/2011 | Nault | 381/380 |

FOREIGN PATENT DOCUMENTS

| | | |
|---|---|---|
| CN | 1820538 A | 8/2006 |
| CN | 201018496 Y | 2/2008 |
| CN | 201422150 Y | 3/2010 |
| GB | 2354755 A | 4/2001 |

(Continued)

OTHER PUBLICATIONS

Japanese Office Action regarding Application No. 2011-237903, dated Oct. 30, 2012. Translation provided by Dragon Intellectual Property Law Firm.

(Continued)

*Primary Examiner* — Brian Ensey
*Assistant Examiner* — Norman Yu
(74) *Attorney, Agent, or Firm* — Harness, Dickey & Pierce, P.L.C.

(57) ABSTRACT

The present invention provides a built-in telescopic earphone structure and a terminal device. The built-in telescopic earphone structure comprises a housing having a containing space, an earphone arranged within the containing space and having an earphone assembly and an earphone line, a connection means for connecting the earphone with a terminal device and transmitting signals, and an earphone line retracting means arranged within the containing space for retracting or releasing the earphone line. The built-in telescopic structure can be used to thoroughly solve the problem of earphone resource waste at the terminal device. When a user uses a terminal device (e.g., when using a telephone), it is unnecessary to lift the terminal device up to head, and the user can directly draw the built-in telescopic earphone out of the built-in telescopic earphone structure of the terminal device, thereby the harm caused by electromagnetic radiation from the terminal device is reduced dramatically.

38 Claims, 23 Drawing Sheets

(56) References Cited

FOREIGN PATENT DOCUMENTS

| | | |
|---|---|---|
| JP | 10108101 | 4/1998 |
| JP | 2001257753 A | 9/2001 |
| JP | 2002218037 A | 8/2002 |
| JP | 2010141864 A | 6/2010 |

OTHER PUBLICATIONS

Korean Office Action regarding Application No. 10-2011-0107546, dated Feb. 22, 2013. Translation provided by Dragon Intellectual Property Law Firm.

\* cited by examiner

BUILT-IN TELESCOPIC EARPHONE STRUCTURE AND TERMINAL DEVICE

This application claims benefit of Chinese Application No. 201010531882.6, filed Nov. 4, 2010, and Chinese Application Nos. 201110146354.3 and 201120181417.4, both filed Jun. 1, 2011, the disclosures of which are incorporated by reference herein in their entirety.

FIELD OF THE INVENTION

The present invention relates to an earphone line retracting structure, in particular to a built-in telescopic earphone structure and a terminal device.

BACKGROUND OF THE INVENTION

With the extensive application of electronic products such as mobile phones, laptop computers, and the products with capability of aiding hearing, etc., it has been found that the earphone of the above products has problems of winding, knotting, and inconvenience of carrying and keeping in use, which has caused some troubles to users and even further made some users give up using earphone.

In addition, when using the electronic products directly, the users cannot avoid electromagnetic radiation resulting from the electronic products, causing harm to the users' health. For example, when the user puts the mobile phone on his ear to communicate with other person via a speaker, the electromagnetic radiation resulting from the mobile phone causes harm to the user's central nerve in brain. It has been found from experiments and study that the harm resulting from electromagnetic radiation to the brain is reduced dramatically when the mobile phone keeps a distance away from the brain by, for example, replacing the speaker inside the mobile phone with a earphone when receiving the sound information. By this way, the harm resulting from electromagnetic radiation to the brain is reduced by more than 90%.

SUMMARY OF THE INVENTION

In order to solve the above problems, an object of the present invention is to provide a built-in telescopic earphone structure and a terminal device so as to reduce the harm resulting from electromagnetic radiation of the terminal device dramatically.

To achieve the above object, the present invention provides a built-in telescopic earphone structure comprising a housing including a containing space; an earphone arranged within the containing space and including an earphone assembly and an earphone line or earphone lines; a connection means for connecting the earphone with the terminal device and transmitting signals between them; and an earphone line retracting means arranged within the containing space for retracting or releasing the earphone line.

Preferably, the housing includes a base plate made of hard materials, and a side wall and an upper edge made of soft material. The base plate, the side wall and the upper edge are formed integrally.

Preferably, the earphone assembly includes a parent-earphone assembly, a child-earphone assembly, and an earphone rod. The parent-earphone assembly and the child-earphone assembly are both arranged on the earphone rod. Also, a switch is provided on the earphone rod for retracting the earphone line.

Preferably, the built-in telescopic earphone structure further comprises a winding device for winding the earphone line. The winding device includes a plurality of rollers and a belt loop arranged on the plurality of rollers.

Preferably, the built-in telescopic earphone structure further comprises a battery for supplying electric power to the earphone line retracting means. The battery is arranged within the containing space, and the plurality of rollers is arranged at a side of the battery.

Preferably, the built-in telescopic earphone structure further comprises a chip processor as the connection means. The chip processor is connected to the battery via a lead wire for controlling charging/discharging of the battery.

Preferably, the housing is provided with a socket for charging, and the chip processor is connected to the socket for charging via a lead wire.

The built-in telescopic earphone structure further comprises a conversion plug assembly, one end of which is connected to the chip processor and the other end of which is connected to a terminal device. The chip processor is used to enable the battery and a battery of the terminal device to share the power supply and/or the socket for charging.

Preferably, the conversion plug assembly includes a lead wire and two plugs at both ends. The plug at one end is connected to the chip processor, and the plug at the other end is inserted to the terminal device. The chip processor is used to communicate the built-in telescopic earphone structure with the terminal device.

Preferably, the built-in telescopic earphone structure is provided with a plurality of the conversion plug assemblies of different types.

Preferably, the earphone line retracting means includes a drive means, a winding reel for winding the earphone line, a speed shift means, a clutch, a signal communication means connected to the earphone line, and a signal line extracted therefrom, which are enclosed by the housing to form an assembly.

Preferably, the drive means of the earphone line retracting means rotates the speed shift means, and the clutch is engaged or disengaged with the winding reel to rotate the winding reel to retract or release the earphone line.

Preferably, the battery is connected to the drive means in the earphone line retracting means via a lead wire.

Preferably, the earphone line retracting means further comprises a line-pressing plate for winding the earphone line regularly.

Preferably, the earphone line comprises bulletproof wires, insulated conductive wires, an earphone line skin, and a plurality of conductors. The conductors consist of a plurality of insulated conductive wires. The insulated conductive wires are arranged in parallel and wound to the bulletproof wires in a spiral fashion. The earphone line skin is attached to and encloses the surface of the insulated conductive wires to form an ultra-thin, flexible and wear-resistant skin. The conductors are located at both ends of the earphone line and connected to the signal communication means of the earphone line retracting means and an O/I port of the earphone respectively when in use.

Preferably, the earphone comprises an earphone rod having a mounting surface, a first connection part, and a first earphone assembly which is connected to the earphone rod via the first connection part in such a manner that its height is variable relative to the mounting surface.

Preferably, the first connection part is an elastic sheet, one end of which is fixedly connected to the mounting surface, and the other end of which is fixedly connected to the bottom of the first earphone assembly.

Preferably, the built-in telescopic earphone structure further comprises a second earphone assembly having a second connection part. The earphone rod has a receiving part, and the second earphone assembly is detachably connected to the earphone rod via the second connection part and the receiving part.

Preferably, the built-in telescopic earphone structure further comprises a joint which convert double earphone lines which are connected to the first earphone assembly and the second earphone assembly to a single earphone line. A transmitter is provided at the joint.

Preferably, the built-in telescopic earphone structure further comprises an winding line groove surrounding the earphone rod for winding a second earphone line connected to the second earphone assembly.

To achieve the above object, the present invention further provides a terminal device comprising a main body and the built-in telescopic earphone structure as mentioned above. The connection means in the built-in telescopic earphone structure is used to effect the connection of the earphone with the main body and the transmission of signals.

Preferably, the terminal device is a mobile phone, a panel computer, a laptop computer, a desktop computer, a television, a hand-held computer, a telephone, a personal audio-visual device, a digital player, a navigation device or a game machine.

To achieve the above object, the present invention further provides a built-in telescopic earphone structure capable of solving the problems of winding and knotting when retracting the earphone line, and providing dual-channel output effection. The built-in telescopic earphone structure comprises a parent-earphone assembly and a child-earphone assembly.

The parent-earphone assembly comprises a parent-earphone receiver, and a first earphone line retracting means for retracting the child-earphone line. The child-earphone assembly includes a child-earphone receiver. The parent-earphone receiver is connected to the parent-earphone line. One end of the child-earphone line is connected to the parent-earphone line via a first signal connection unit, and the other end is connected to the child-earphone receiver.

Preferably, the parent-earphone assembly further comprises a parent-earphone front cover and a parent-earphone rear cover. The parent-earphone receiver is arranged between the parent-earphone front cover and the parent-earphone rear cover, and the first earphone line retracting means is arranged between the parent-earphone receiver and the parent-earphone rear cover.

The child-earphone assembly further comprises a child-earphone front cover and a child-earphone rear cover, and the child-earphone receiver is arranged between the child-earphone front cover and the child-earphone rear cover.

Preferably, the parent-earphone assembly further comprises a parent-earphone rod arranged on the parent-earphone rear cover. The child-earphone assembly may be clamped to the parent-earphone rod via a buckle.

Preferably, the built-in telescopic earphone structure further comprises a transmitter which is arranged on the parent-earphone rod and connected to the parent-earphone line.

Preferably, the first earphone line retracting means comprises a winding reel which is arranged on a main shaft. The winding reel is provided with an annular flange. Inside the annular flange is provided with a torsion spring, an outer end of which is fixedly arranged on the annular flange and an inner end of which is fixedly arranged on the main shaft for rotating the winding reel to retract the child-earphone line. The child-earphone line wound on the winding reel is connected to the parent-earphone line via the first signal connection unit.

Preferably, the first earphone line retracting means is further provided with a braking means for controlling rotation of the winding reel.

Preferably, the built-in telescopic earphone structure further comprises a second earphone line retracting means having an electric motor for providing driving force. The electric motor drives the winding reel arranged on the main shaft via a speed shift means, and the parent-earphone line wound on the winding reel is connected to external signals via a second signal connection unit.

Preferably, the speed shift means comprises a screw connected to a drive shaft of the electric motor; a first gear which is a two-stage gear and one stage of which is vertically meshed with the screw; and a second gear which is arranged on the same main shaft as the winding reel, and meshed with the other stage of the first gear. The second gear drives the winding reel to retract the parent-earphone line.

Preferably, the second earphone line retracting means further comprises a housing having an upper housing part and a base. A side wall of the housing is provided with an opening in which a pulley wheel is arranged. The pulley wheel is arranged on the base via a pulley wheel shaft, and the parent-earphone line extends out of the housing via the pulley wheel.

Preferably, the second earphone line retracting means further comprises a clutch means arranged between the electric motor and the winding reel so as to effect engagement or disengagement of the electric motor with the winding reel.

Preferably, the clutch means includes a compression spring arranged on the main shaft. One end of the compression spring is in contact with a bottom surface of the base, and the other end is in contact with the second gear.

Preferably, the second signal connection unit includes a circuit board. The circuit board is provided with a plurality of annular conductive sheets which are connected to the parent-earphone line. The conductive sheets are connected to external signals via a spring feeler and a feeler lead. The spring feeler is in communication with the conductive sheets.

Preferably, the built-in telescopic earphone structure further comprises a second earphone line retracting means having a drive system; a drive wheel arranged at one side of the drive system and driven thereby; a support wheel arranged at the other side of the drive system; and a winding loop surrounding the drive wheel and the support wheel for winding the parent-earphone line. The parent-earphone line wound on the winding loop is connected to external signals via the second signal connection unit. The drive wheel rotates the support wheel via the winding loop, so that the parent-earphone line is wound on the winding loop and thereby retracted.

Preferably, the second earphone line retracting means further comprises a clutch means arranged between the drive system and the drive wheel. The drive system drives the drive wheel via the clutch means, and the drive system is separated from the drive wheel when the drive wheel is rotated by releasing the parent-earphone line or the retraction of the earphone line is completed.

Preferably, the drive system is a micromotor, and the clutch means is a frustum gear.

Preferably, the drive wheel comprises a first circular side sheet and a second circular side sheet which are connected to each other via a main shaft. An inner side of the first circular side sheet is provided with a plurality of gears circumferentially arranged around the main shaft.

The micromotor is engaged or disengaged with the frustum gear via the gears arranged on the main shaft of the micromotor.

Preferably, the winding loop is provided with an winding line groove formed by a plurality of U-shaped line grooves, and the parent-earphone line is wound within the winding line groove when retracted.

Preferably, the built-in telescopic earphone structure further comprises a long ellipse housing. A side wall of the housing is provided with an opening, through which the parent-earphone line extends out of the housing.

Preferably, the second signal connection unit comprises, at the outside of the U-shaped line grooves, a plurality of signal communication elastic sheets to which the parent-earphone line is connected, and a plurality of signal communication tracks which are arranged on an inner wall of the housing and capable of being contacted to the signal communication elastic sheets so as to achieve communication. The signal communication tracks consist of annular conductive metal sheets and are connected to signals from a main board of an external terminal via a signal line.

Preferably, the support wheel is a plurality of balls or rollers arranged in a semicircular manner.

As can be seen from the above technical solutions, the embodiments of the present invention have the following beneficial effects.

(1) In one embodiment, the built-in telescopic earphone structure can be used to thoroughly solve the problem of earphone resource waste at the terminal device. When a user uses a terminal device (e.g., when using a telephone), it is unnecessary to lift the terminal device up to head, and the user can directly draw the built-in telescopic earphone out of the built-in telescopic earphone structure of the terminal device, thereby the harm caused by electromagnetic radiation from the terminal device is reduced dramatically.

(2) In one embodiment, the side wall and the upper edge of the housing are both made of soft materials capable of being stretched and retracted, thus the housing of the built-in telescopic earphone structure can be adapted to mount to the terminal device of any types.

(3) Different from the traditional earphone line which is thick and stiff, and easy to be broken when it is wound for hundreds of times, the earphone line in this embodiment is very thin and soft, and it will not be broken even if it is wound for tens of thousands of times, thus the requirement of service life of "built-in telescopic earphone" will be met.

(4) In another embodiment of this invention, the child-earphone line of the child-earphone is retracted by the retracting means on the parent-earphone, thus it will facilitate the retraction of the parent-earphone line (a single line), and the child-earphone can be separated from the parent-earphone so as to achieve a dual-channel output. When dual-channel or stereo output is undesired, only the parent-earphone will be used. When dual-channel or stereo output is desired, the child-earphone and the child-earphone line will be drawn out of the parent-earphone, and the child-earphone and the parent-earphone are put on the two ears respectively so as to receive audio message.

DETAILED DESCRIPTION OF THE INVENTION

In order to explain the purpose, the technical solution and the advantages of the present invention in a clearer manner, the present invention is further described hereinafter by combining the embodiments and the Drawings. The illustrative embodiments and the explanation thereof are used herein to explain the present invention, but cannot be regarded as limitation to the present invention.

First Embodiment

Figure 1:
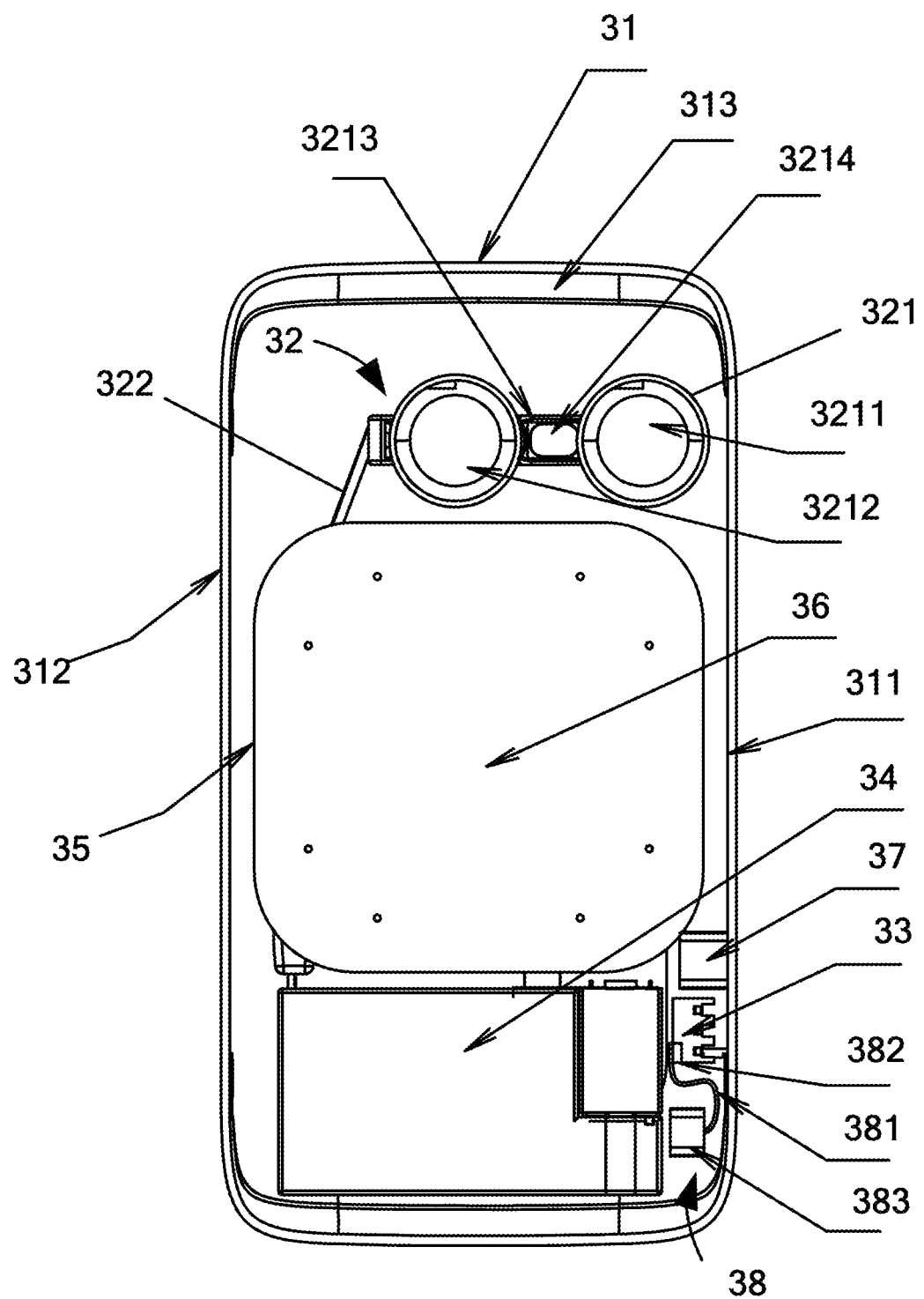
FIG. 1 is a front view showing a built-in telescopic earphone structure according to the first embodiment of the present invention.
Figure 2:
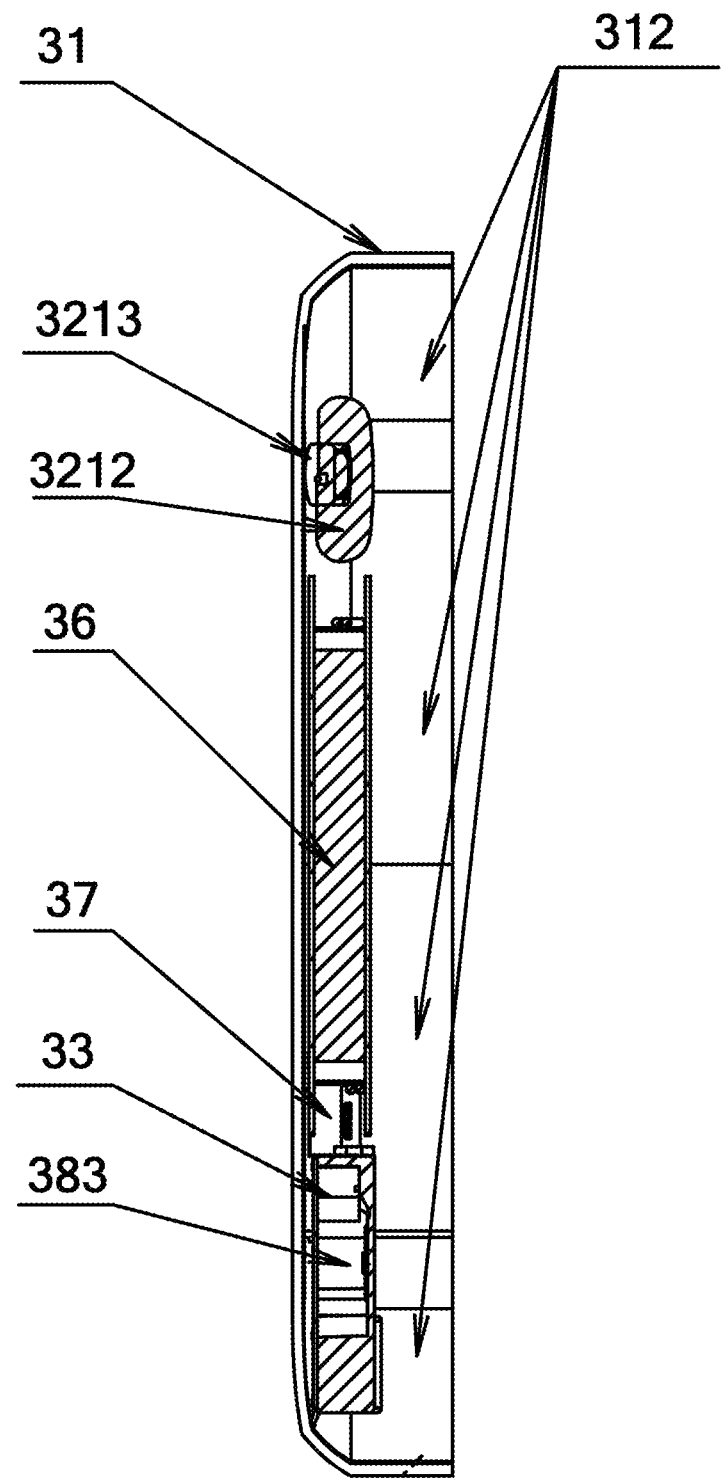
FIG. 2 is a side view showing a built-in telescopic earphone structure according to the first embodiment of the present invention.

As shown in FIGS. 1-2, a built-in telescopic earphone structure according to the first embodiment of the present invention comprises: a housing 31 having an containing space (not shown); an earphone 32 arranged within the containing space and having an earphone assembly 321 and an earphone line 322; a connection means 33 for connecting the earphone 32 with a terminal device and for transmission of signals; and an earphone line retracting means 34 arranged within the containing space for retracting or releasing the earphone line 322.

In this embodiment, functional modules of the terminal device may also be arranged within the containing space, such as a display screen, a processing chip, a receiver, and a camera. Understandably, the shape of the containing space is not defined in this embodiment.

The terminal device may be a mobile phone, a panel computer, a laptop computer, a desktop computer, a television, a hand-held computer, a telephone, a personal audio-visual device, a digital player, a navigation device or a game machine.

Figure 3:
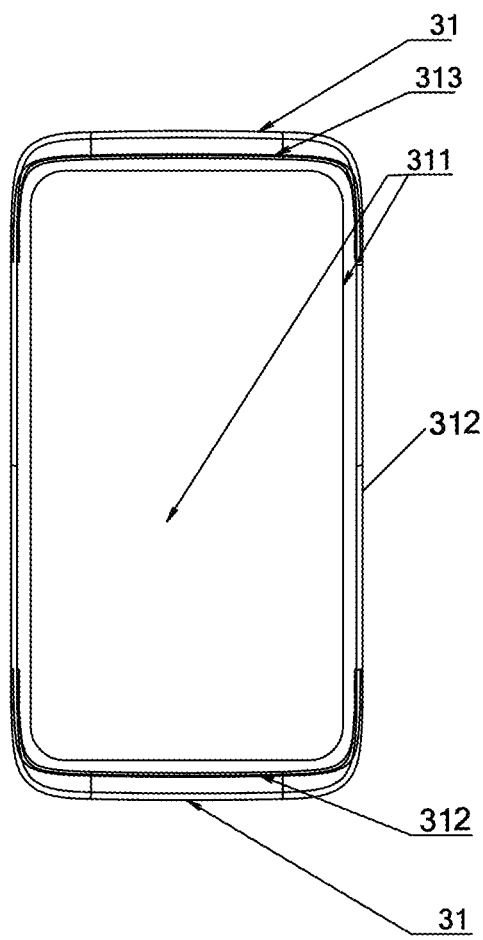
FIG. 3 is a front view showing a housing of the built-in telescopic earphone structure according to the first embodiment of the present invention.
Figure 4:
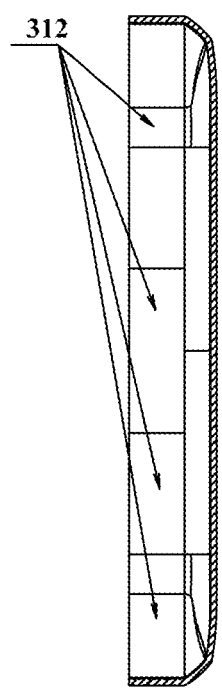
FIG. 4 is a sectional view showing a housing of the built-in telescopic earphone structure according to the first embodiment of the present invention.

Referring to FIGS. 3-4, in this embodiment, the housing 31 comprises a base plate 311 made of hard materials, side walls 312 and an upper edge 313 made of soft materials. The base plate 311, the side walls 312 and the upper edge 313 are formed integrally to house the functional modules such as the built-in telescopic earphone structure.

In this embodiment, the soft materials may be plastic, elastic materials.

In this embodiment, the base plate 311 is made of hard materials, and the side walls 312 and the upper edge 313 are made of soft materials capable of being stretched and retracted. Understandably, the components of the above-mentioned hard and soft materials are not defined in this embodiment.

When manufacturing the housing 31, the side walls 312 and the upper edge 313 are mounted at the sides of the base plate 311. The side walls 312 and the upper edge 313 made of soft materials are supported by the base plate 311 made of hard materials so as to form a long, basin-shaped article with an inward edge (as shown in FIGS. 3-4).

Moreover, because the side walls 312 and the upper edge 313 may both be made of soft materials capable of being stretched and retracted, the housing 31 may be adapted to the terminal device of any size.

In this embodiment and the drawings, merely the earphone assembly 321 which is a double earphone assembly is taken as an example. Of course, the earphone assembly 321 may also be a single earphone assembly, and its built-in telescopic earphone structure has the same structure as that mentioned in this embodiment, thus it is omitted herein.

Referring to FIG. 1 again, the earphone assembly 321 comprises a parent-earphone assembly 3211, a child-earphone assembly 3212 and an earphone rod 3213. The parent-earphone assembly 3211 and the child-earphone assembly 3212 may be arranged on the earphone rod 3213.

When dual-channel or stereo output is undesired, merely the parent-earphone assembly 3211 is used, and when dual-channel or stereo output is desired, the parent-earphone assembly 3211 and the child-earphone assembly 3212 are put on the two ears of a user respectively so as to receive audio messages, and thereby provide the user with dual-channel or stereo output effect.

In addition, in order to facilitate the operation, the earphone 32 is also provided with a retraction switch 3214 which controls the ON and OFF states of the power supply of a drive means (e.g., a micromotor) in the earphone line retracting means 34 via a signal line provided in the earphone line 322, thereby to flexibly control the retracting operation of the earphone line 322.

Figure 5:
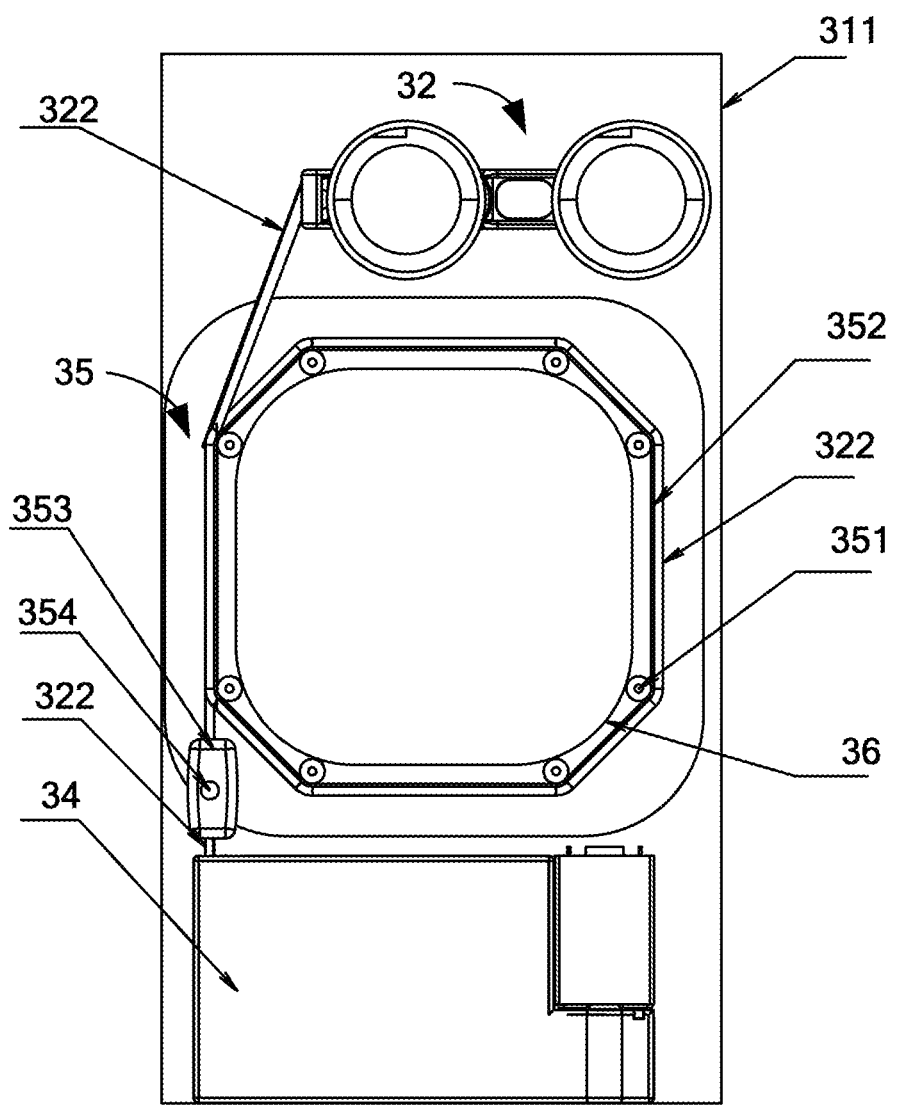
FIG. 5 is a structural schematic view showing a battery and a winding device of the built-in telescopic earphone structure according to the first embodiment of the present invention.

Referring to FIG. 5, the built-in telescopic earphone structure further comprises a winding device 35 for winding the earphone line 322. The winding device 35 comprises a plurality of rollers 351 and a belt loop 352 arranged on the plurality of rollers 351. Understandably, the arrangement mode and the number of the rollers 351 are not defined in this embodiment.

In this embodiment, baffles are provided at both sides of the rollers 351 so as to form an winding line groove. The belt loop 352 is sleeved on the rollers 351, and the earphone line 322 is wound on the belt loop 352. The arrangement of the rollers 351 and the belt loop 352 can effectively reduce the frictional force between the earphone line 322 and the winding device 35 when winding the earphone line 322.

Referring to FIG. 5 again, the built-in telescopic earphone structure further comprises a battery 36 for supplying power to the earphone line retracting means 34. The battery 36 is arranged within the containing space.

As shown in FIG. 5, the plurality of rollers 351 may, but not limited to, be arranged at a side of the battery 36.

In this embodiment, the battery 36 is preferably a rechargeable battery, e.g., a nickel metal hydride battery (Ni-MH battery) or a lithium battery. Of course, the model and type of the battery are not defined in this embodiment.

Referring to FIG. 5 again, the earphone line retracting means 34 is arranged at one end of the base plate 311. The battery 36 and the winding device 35 around the battery 36 are provided in the middle of the base plate 311. The earphone 32 may be arranged at the other end of the base plate 311 (as shown in FIG. 5).

When the earphone 32 is to be used, it may be drawn out of the containing space. After use, the earphone 32 is retracted into the containing space through the earphone line retracting means 34.

Figure 6:
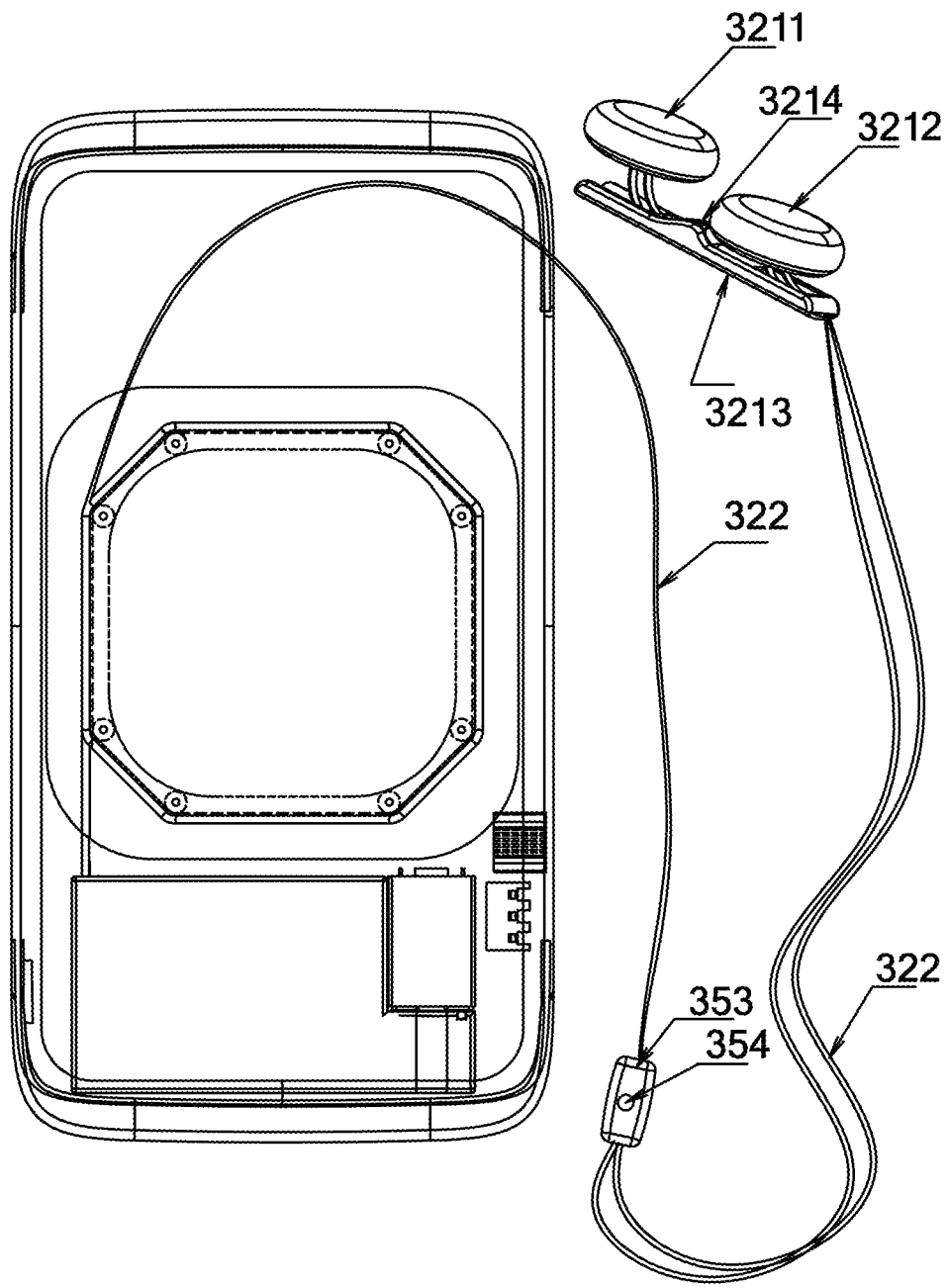
FIG. 6 is a structural schematic view after the earphone line of the built-in telescopic earphone structure is drawn out of the housing according to the first embodiment of the present invention.

Take the earphone assembly 321 which is a double earphone assembly as an example. A single earphone line is extracted from the earphone line retracting means 34, and then converted to double earphone lines via a conversion joint 353. The double earphone lines are wound around the winding device 35 for one circle and then connected to the earphone rod 3213. Meanwhile, the base plate 311 where the earphone rod 3213 is located is provided with a groove. When the earphone assembly is adapted to a terminal device, the earphone 32 may be pushed out through the groove of the base plate 311, thereby the earphone assembly 321 and the earphone line 322 may be drawn out so as to use the telephone or listen to music (as shown in FIG. 6).

In this embodiment, a transmitter 354 may further be provided at the conversion joint 353 which converts a single earphone line to double earphone lines.

In other words, when the earphone assembly 321 is a double earphone assembly, the earphone line 322 connected to the earphone rod 3213 is double earphone lines, which may be converted to a single earphone line through the convention joint 353. When the earphone 32 is placed within the containing space, merely a certain length of the double earphone lines, or a certain length of the double earphone lines and the single earphone line, is wound on the winding device 35, but merely the single earphone line is wound within the earphone line retracting means 34. Thus, by winding a certain length of the double earphone lines on the winding device 35, it is able to ensure that the parent-earphone assembly 3211 and the child-earphone assembly 3212 can be wore on the two ears of the user normally.

In this embodiment, the built-in telescopic earphone structure further comprises a chip processor as the connection means 33. The chip processor is connected to the battery 36 via a lead wire for controlling charging and/or discharging of the battery 36.

In this embodiment, the chip processor may consist of the existing electronic elements for identifying and processing telephoning or listening to music with the earphone, or enabling the battery of the terminal device and the battery of the built-in telescopic earphone structure to share a power supply. Understandably, the type of the chip processor is not defined in this embodiment.

Referring to FIGS. 1-2 again, the housing 31 is provided with a socket 37 for charging, to which the chip processor is connected via a lead wire.

The built-in telescopic earphone structure further comprises a conversion plug assembly 38, one end of which is connected to the chip processor, and the other end of which is connected to the terminal device. The chip processor is used to enable the battery 36 and the battery of the terminal device to share the power supply and the socket 37 for charging.

At this time, the battery 36 corresponds to a standby battery of the terminal device, thereby the endurance of the terminal device can be improved effectively.

In this embodiment, the socket 37 for charging may be realized by a Mini-USB interface. Of course, the structure of the socket 37 for charging is not defined in this embodiment.

Referring to FIGS. 1-2 again, the conversion plug assembly 38 comprises a lead wire 381 and two plugs 382, 383 at both ends thereof. The plug 382 at one end is inserted into the chip processor, and the plug 383 at the other end is inserted into the terminal device. The built-in telescopic earphone structure is in communication with the terminal device through the chip processor.

In this embodiment, the built-in telescopic earphone structure may be provided with several conversion plug assemblies 38 of different types, and the user may make choice according to different terminal devices.

It can therefore be seen that, in this embodiment, on the surface of the base plate 311 is also provided with the socket 37 for charging and the chip processor. Meanwhile, the chip processor is provided with a socket into which the conversion plug assembly 38 is inserted. In FIG. 1, 381 is a lead wire, 383 is a plug inserted into the terminal device adapted, and 382 is a plug inserted into the chip processor. The length of the lead wire 381 may be longer, and several available conversion plug assemblys 38 of different types shall be provided during the adaptation.

In this embodiment, the socket 37 for charging is connected to the battery 36 via the lead wire. The battery 36 can be connected to the drive means of the earphone line retracting means 34 and meanwhile to the chip processor, and shares a power supply with the battery 36 of the terminal device via the conversion plug assemblies 38.

When in use, the application of the terminal device will be completed merely by inserting the conversion plug assembly 38 into the terminal device (e.g., a mobile phone), and then inserting the terminal device into the housing 31 of the built-in telescopic earphone structure.

In the earphone structure of this embodiment, the earphone assembly is connected in such a manner that its height is variable relative to a mounting surface. When the earphone is to be used, the earphone assembly protrudes from the mounting surface in a relatively high height, and when the earphone is not to be used, the earphone assembly may be much closer to the mounting surface so as to reduce the thickness of the earphone structure as a whole.

Figure 7:
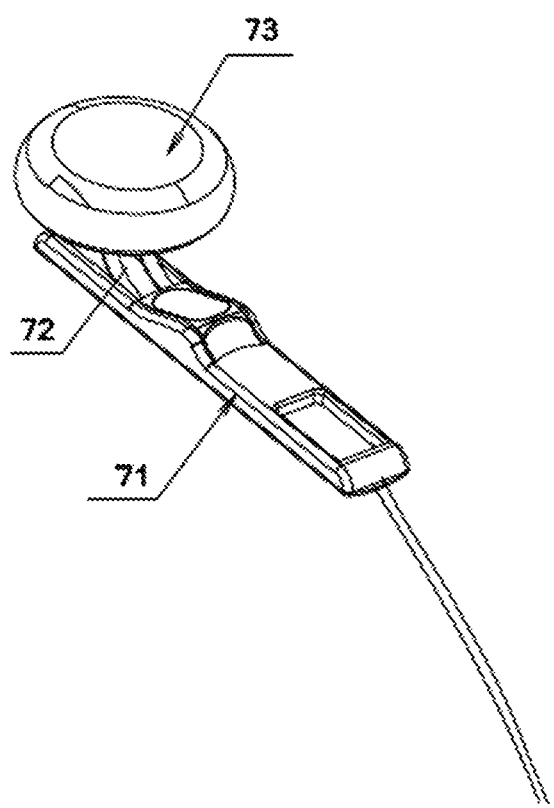
FIG. 7 is a structural schematic view showing an earphone according to the first embodiment of the present invention.

FIG. 7 is a schematic view showing the earphone according to the first embodiment of the present invention. The earphone comprises an earphone rod 71 having a mounting surface, a first connection part 72, and a first earphone assembly 73 which is connected to the earphone rod 71 via the first connection part 72 in such a manner that its height is variable relative to the mounting surface.

In the embodiment of the present invention, the first earphone assembly 73 is connected to the earphone rod 71 via the first connection part 72. However, the first earphone assembly 73 is variable in height relative to the mounting surface of the connection rod 71. Thus, when the earphone is not to be used, the first earphone assembly 73 protrudes from the mounting surface in a relatively high height, such that it can extend into the auricle, and when the earphone is not to be used, the height of the first earphone assembly 73 may be decreased so as to reduce the thickness of the earphone structure as a whole.

In the structure as shown in FIG. 7, it can be found that the first connection part 72 may be an elastic sheet, one end of which is fixedly connected to the mounting surface, and the other end of which is fixedly connected to the bottom of the first earphone assembly 73.

When it needs to use the earphone, the earphone structure is unrestrained. Under the effect of the elastic force of the elastic sheet, the end of the elastic sheet connected to the first earphone assembly 73 is at a first height such that the first earphone assembly 73 can extend into the auricle.

When it does not need to use the earphone, a certain pressure is applied to the first earphone assembly 73. Under the effect of the pressure, the first earphone assembly 73 presses the elastic sheet so that the elastic sheet becomes closer to the mounting surface. The height of the first earphone assembly 73 also decreases relative to the mounting surface, thereby the whole thickness of the earphone is reduced so that the earphone can be easily contained in a thinner housing of the electronic device.

Of course, in the embodiment of the present invention, there may be one or more elastic sheets, e.g., two as shown in FIG. 7, or even more.

According to the above-mentioned description, the first earphone assembly 73 is connected to the earphone rod 71 via the elastic sheet structure in such a manner that its height is variable relative to the mounting surface. Understandably, some other methods may also be used to connect the first earphone assembly 73 to the earphone rod 71 in a height-variable manner, which are described as follows.

The bottom of the first earphone assembly 73 is mounted with a threaded bolt, and a threaded hole is formed on the earphone rod 71. When in use, the threaded bolt at the bottom of the first earphone assembly 73 is screwed out of the threaded hole so as to drive the first earphone assembly 73 to move up relative to the mounting surface and to increase the height of the first earphone assembly 73 relative to the mounting surface. When not in use, the threaded bolt at the bottom of the earphone assembly 73 is screwed into the threaded hole so as to drive the first earphone assembly 73 to move down relative to the mounting surface and to decrease the height of the first earphone assembly 73 relative to the mounting surface, so that the thickness of the earphone as a whole is reduced and the earphone can be easily contained in a thinner housing of the electronic devices.

Understandably, the threaded bolt may also be arranged in such a manner that it projects beyond the mounting surface, and the threaded hole is provided at the bottom of the first earphone assembly 73, so as to make the relative height of the two variable.

If the height of the first earphone assembly 73 relative to the mounting surface is decreased/increased in a rotation manner relative to the mounting surface, the earphone line will likely be wound on the threaded bolt. To solve this problem, the first connection part 72 is effected by a spring which is provided on the mounting surface and projects therefrom, and meanwhile the bottom of the first earphone assembly 73 is fixedly connected to the top of the spring.

When in use, the earphone structure is unrestrained. Under the effect of the elastic force of the spring, the first earphone assembly 73 is at a first height so that it can extend into the auricle. When not in use, a certain pressure is applied to the earphone assembly. Under the effect of the pressure, the first earphone assembly 73 presses the spring. The height of the first earphone assembly 73 decreases relative to the mounting surface, thereby the whole thickness of the earphone structure is reduced so that the earphone structure can be easily contained in a thinner housing of the electronic devices.

In the above structures, merely the first earphone assembly 73 is mentioned. Understandably, along with the capability becoming more and more greater, the electronic devices can be used for various tasks such playing music, playing video, and etc, thus more and more electronic devices use dual-channel earphone, i.e., the earphone having two earphone assemblies. In this case, the earphone structure further comprises a second earphone assembly 74, and understandably, it may also use the same structure.

However, the earphone structure will have a big size if the two earphone assemblies both use the above-mentioned structure. In this embodiment, a certain structure is provided so that the second earphone assembly 74 can be connected to the earphone rod in a detachable manner so as to reduce the size of the earphone structure as a whole. Meanwhile, the earphone structure can be contained in the housing of the electronic device without increasing the thickness of the housing.

Figure 8:
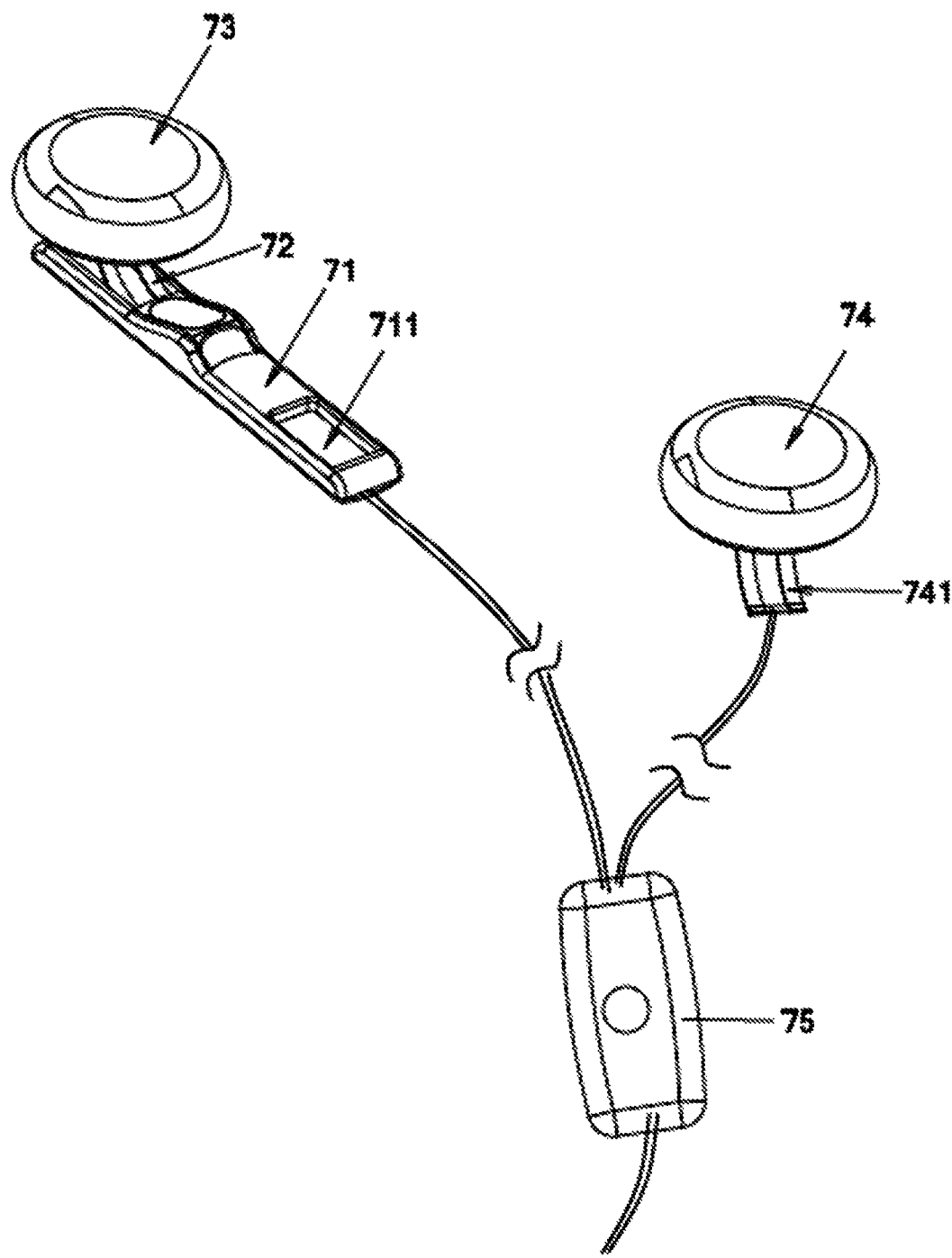
FIG. 8 is a structural schematic view showing an earphone assembly including a parent-earphone assembly and a child-earphone assembly according to the first embodiment of the present invention.

The above-mentioned earphone structure, as shown in FIG. 8, further comprises a second earphone assembly 74 having a second connection part 741. The earphone rod 71 is provided with a receiving part 711. The second earphone assembly 74 is detachably connected to the earphone rod 71 via the second connection part 741 and the receiving part 711.

In this embodiment, several methods can be used to connect the second earphone assembly 74 with the earphone rod 71 in a detachable manner, which are described hereinafter by combining Method 1 and Method 2.

<Method 1>

Figure 9:
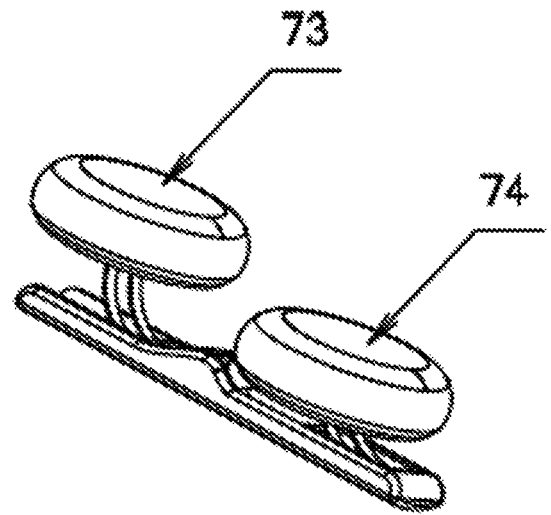
FIG. 9 is a structural schematic view after the earphone assembly including a parent-earphone assembly and a child-earphone assembly attached to an earphone rod according to the first embodiment of the present invention.

As shown in FIG. 8, the second connection part 741 is a sheet-like structure provided at the bottom of the second earphone assembly 74, and a slot 711 is provided on the earphone rod 71 for receiving the sheet-like structure. When not in use, the second connection part 741 of the sheet-like structure is inserted into the slot 711 so that the second earphone assembly 74 is attached to the earphone rod 71, as shown in FIG. 9. When in use, the second connection part 741 of the sheet-like structure is drawn from the slot 711 so that the second earphone assembly 74 is separated from the earphone rod 71, as shown in FIG. 8.

Of course, the thickness of the first earphone assembly 73 is substantially the same as that of the second earphone assembly 74. If the depth of the slot 711 is greater than the height of the sheet-like structure, it is able to ensure that the height of the second earphone assembly 74 relative to the mounting surface will not be greater than that of the first earphone assembly 73 relative to the mounting surface when the second connection part 741 of the sheet-like structure is inserted into the slot 711. Thus, the second earphone assembly 74 can also be contained in the housing of the electronic device without increasing the thickness of the housing. When used alone, the entire size of the earphone structure will also be reduced.

<Method 2>

Figure 10:
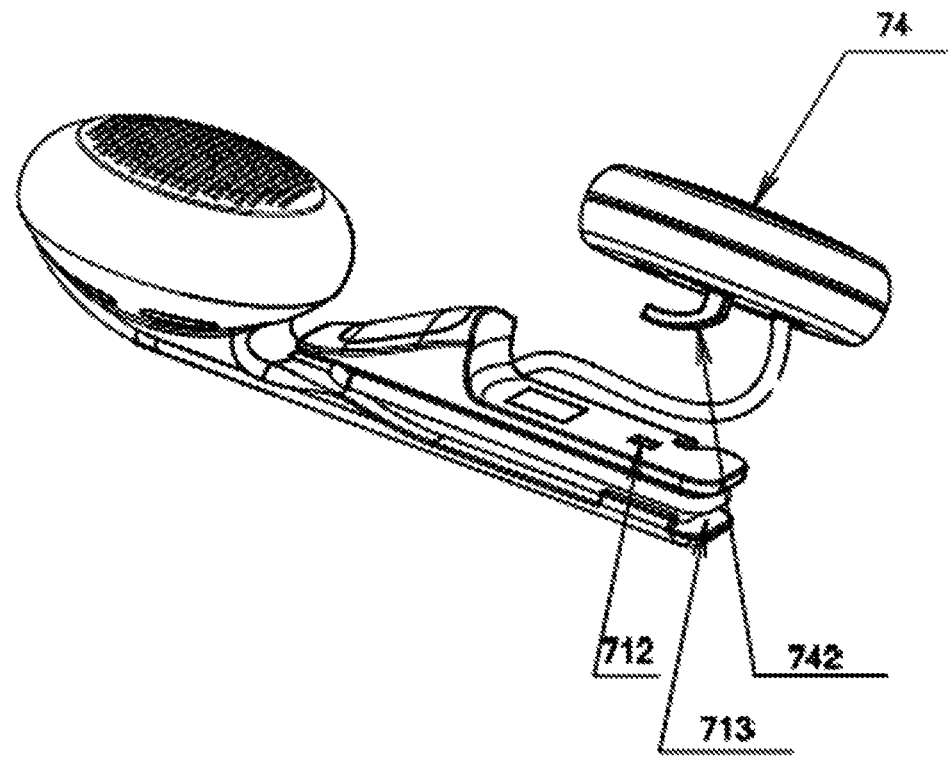
FIG. 10 is a structural schematic view showing another earphone structure of the earphone assembly including a parent-earphone assembly and a child-earphone assembly according to the first embodiment of the present invention.

As shown in FIG. 10, the earphone rod is configured as a hollow structure (not shown), and a throughhole 712 is provided on the mounting surface to communicate with the hollow structure. A hook 742 is provided at the bottom of the second earphone assembly 74. The hook 742 enters the hollow structure via the throughhole 712 so as to attach the second earphone assembly 74 to the earphone rod 71. When in use, the hook 742 is drawn out through the throughhole 712 so that the second earphone assembly 74 is separated from the earphone rod 71.

Using the above-mentioned structure, the height of the second earphone assembly 74 relative to the mounting surface will not be greater than that of the first earphone assembly 73 relative to the mounting surface, and the second earphone assembly 74 can be contained in the housing of the electronic device without increasing the thickness of the housing. When used alone, the entire size of the earphone structure will also be reduced.

In this embodiment of the present invention, for the earphone structure including a parent-earphone assembly and a child-earphone assembly, each earphone assembly is connected with an earphone line. If the earphone line is too long, it will be wound together and thus is inconvenient to use.

Therefore, as shown in FIG. 8, a joint 75 is also provided. The double earphone lines connected to the first earphone assembly 73 and the second earphone assembly 74 are converted to a single earphone line via the joint 75, and then connected to an audio interface of the electronic device via the single earphone line.

Considering the bidirectional audio communication, a transmitter may also be provided at the joint 75 so as to collect acoustic signals.

Generally, for the earphone structure including double earphone assemblies, the first earphone assembly 73 is fixedly connected to the earphone rod 71, thus the earphone line connected to the other earphone assembly shall be sufficiently long to enable the other earphone assembly to be placed into the other auricle.

In order to ensure that the earphone line of the second earphone assembly 74 is sufficiently long, as shown in FIG. 10, an winding line groove 713 is provided on the earphone rod 71 for winding the second earphone line connected to the second earphone assembly 74.

When not in use, the earphone line of the second earphone assembly 74 is wound in the winding line groove 713, and when in use, the earphone line can be drawn from the winding line groove 713 and thus its length will be extended.

Such a structure is especially useful when a joint is provided to convert the double earphone lines to a single earphone line but the earphone line retracting means cannot receive the joint. Further explanation is given as follows.

Because the joint for the earphone lines cannot be contained into the earphone line retracting means, the earphone lines ahead of the joint must be sufficiently long to ensure that the two earphone assemblies can be placed into the right and left auricles respectively. However, considering that the space inside the electronic device is limited, if the earphone lines ahead of the joint is too long and there is no other auxiliary structure, a long earphone line will not be retracted into the housing of the electronic device when the joint reaches the earphone line retracting means, and a bad effect will be obtained. If the earphone line is precisely retracted into the housing of the electronic device when the joint reaches the earphone line retracting means, the earphone line ahead of the joint is insufficiently long to ensure that the two earphone assemblies can be placed into the right and left auricles respectively. To solve the above-mentioned problem, a part of the earphone line is wound by the winding line groove in this embodiment. When not in use, the earphone line of the second earphone assembly is wound in the winding line groove. At this time, the distance between the earphone assembly and the plug is reduced remarkably, thus the earphone line can be retracted into the housing of the electronic device when the joint reaches the earphone line retracting means. When in use, the earphone line is drawn from the winding line groove, and the earphone line ahead of the joint is lengthened so that the two earphone assemblies can be placed in the right and left auricles respectively.

Figure 11:
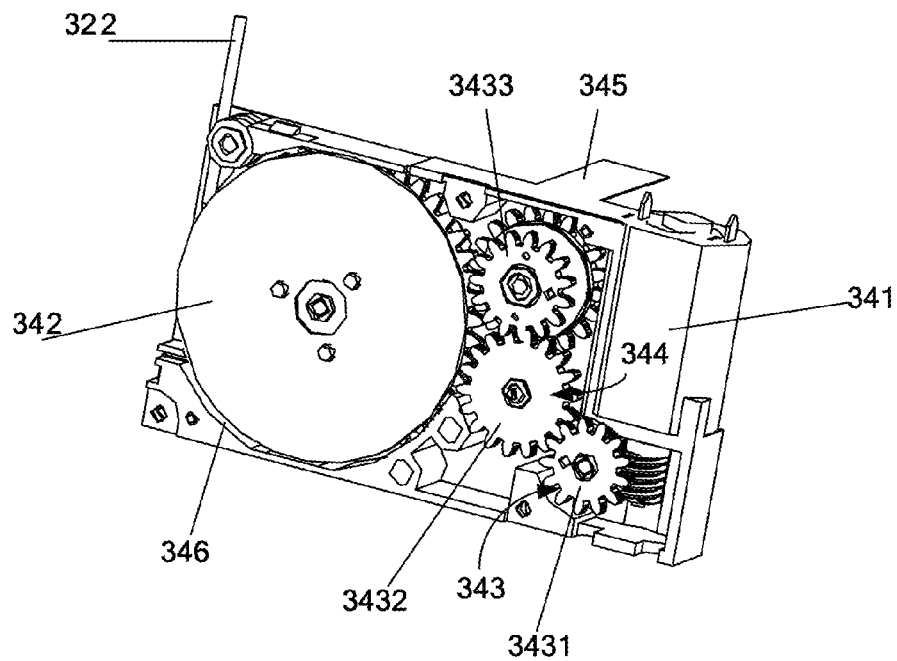
FIG. 11 is a schematic view showing an earphone line retracting means according to the first embodiment of the present invention.
Figure 12:
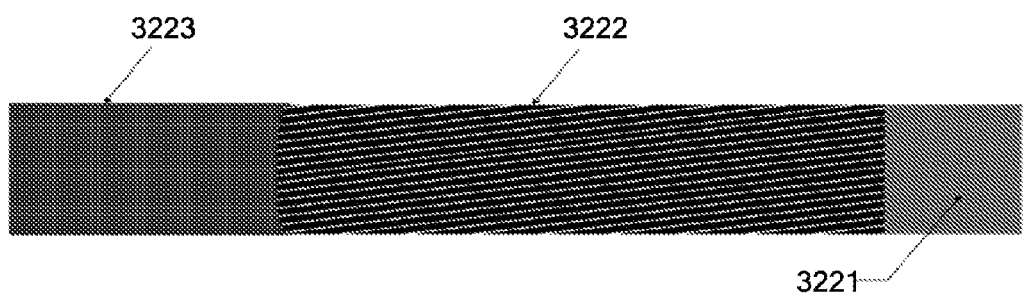
FIG. 12 is a perspective sectional view showing the structure of an earphone line according to the first embodiment of the present invention.

Referring to FIGS. 11-12, the earphone line retracting means 34 comprises a drive means 341, a winding reel 342 for winding the earphone line 322, a speed shift means 343, a clutch 344 and a signal communication means 345 connected to the earphone line 322, which are enclosed within the housing to form an assembly.

In this embodiment, the drive means 341 of the earphone line retracting means 34 is engaged or disengaged with the winding reel 342 via the speed shift means 343 and the clutch 344, and rotates the winding reel 342 to retract or release the earphone line 322. The battery 36 is connected to the drive means 341 of the earphone line retracting means 34 via a lead wire.

The earphone line retracting means 34 further comprises a line pressing plate 346 for winding the earphone line 322 regularly.

In this embodiment, the drive means 341 may be a micromotor, a spring or any other drive means capable of supplying power. Preferably, the drive means 41 is a micromotor.

In this embodiment, the clutch 344 consists of a gear 3432, a spring and a friction plate, and the engagement or disengagement is effected by the resistance. The speed shift means 343 consists of a plurality of gears (e.g., gears 3431, 3432, 3433) which cooperate with each other to provide proper rotation speed.

In this embodiment, the speed shift means 343 is provided so as to decelerate the micromotor, thereby to increase the moment. The clutch 344 is provided so as to separate the winding reel 342 from the micromotor when excessive resistance occurs. This will protect the micromotor and operate the micromotor safely, and meanwhile the earphone line 322 can be easily drawn out.

The line pressing plate 346 is provided so that the earphone line 322 wound in the winding reel 342 is not loosen but arranged regularly.

In this embodiment, in order to enable the earphone line 322 in the built-in telescopic earphone structure to be retracted and released freely, the earphone line 322 may be soft and slim.

Figure 13:
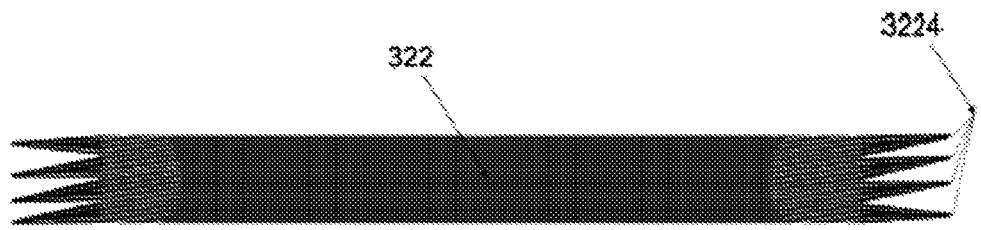
FIG. 13 is a perspective sectional view slowing the structure of end portions of the earphone line according to the first embodiment of the present invention.

Referring to FIGS. 12-13, the earphone line 322 comprises bulletproof wires 3221, insulated conductive wires 3222, and an earphone line skin 3223. The earphone line 22 further comprises a plurality of conductors 3224 consisting of a plurality of insulated conductive wires 3222. The insulated conductive wires 3222 are arranged in parallel and wound to the bulletproof wires 3221 in a spiral fashion. The earphone line skin 3223 is attached to and encloses the surface of the insulated conductive wires 3222 to form an ultra-thin, soft and wear-resistant skin. The conductors 3224 are located at both ends of the earphone line 322 and connected to the connection means 33 and an O/I port of the earphone 32 respectively when in use.

Referring FIGS. 12-13, the earphone line 322 of the present invention is configured in such a manner that the plurality of insulated conductive wires 3222 are arranged in parallel, wound to the bulletproof wires 3221 tightly and integrated into the earphone line skin 3223 so as to manufacture the semi-manufactured earphone line 322. Then, the earphone line is cut according to the desired length, the skins at the two ends of the earphone line are peeled off to expose the insulated conductive wires 3222, and every couple of the insulated conductive wires 3222 is grouped to form the conductor 3224.

Generally, the earphone line 322 consists of 3 to 8 conductors 3224 (as shown in FIG. 13).

It is to be indicated that, the bulletproof wires 3221 are formed by a plurality of fine threads having strong tensile force, so as to enhance the tensile strength of the manufactured earphone line 22. The earphone line skin 3223 is made of a high-molecular material with good wear-resistance, strong adhesion and excellent flexibility, so as to enhance the flexibility and wear-resistance of the manufactured earphone line 22.

For the earphone line 322 manufactured according to the above technology and process, because the insulated conductive wires 3222 are arranged in parallel and wound on the bulletproof wires 3221 and then integrated into the earphone line skin, there is no gap or "trench" within the earphone line 322, thereby the bending angle of the earphone line 322 is reduced during the winding, and the curling radius and gap of the earphone line 322 are reduced too. (According to the known technology, a plurality of electric wires are wound on a bulletproof wire 3221 to form a conductor 3224, a plurality of conductors 3224 are wound together on another bulletproof wire 3221 and then integrated into the earphone line skin to form an earphone line. For the earphone line manufacture by this technology and process, there are relatively big gaps and trenches within the earphone line, thus more materials will be filled thereinto and the earphone line is thick and stiff. Moreover, the curling radius and the gap of the earphone line will be increased during the winding, thus the earphone line is more easily to be broken and damaged.) However, the earphone line manufactured by the above-mentioned new technology and process will not be broken even if it is wound for tens of thousands of times within a small space, thus the design requirement and purpose of the built-in telescopic earphone structure will be achieved.

In this embodiment, the present invention further provides a terminal device comprising a main body and the built-in telescopic earphone structure as mentioned above. The connection of the earphone with the main body and the transmission of signal can be effected through the connection means in the built-in telescopic earphone structure.

In this embodiment, the terminal device is a mobile phone, a panel computer, a laptop computer, a desktop computer, a television, a hand-held computer, a telephone, a personal audio-visual device, a digital player, a navigation device or a game machine.

Figure 15:
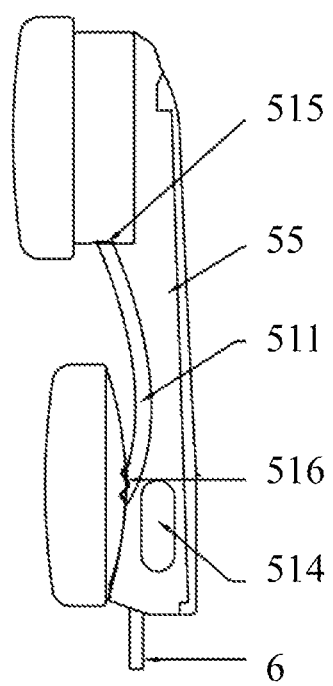
FIG. 15 is a schematic view showing a built-in telescopic earphone structure according to the second embodiment of the present invention.
Figure 16:
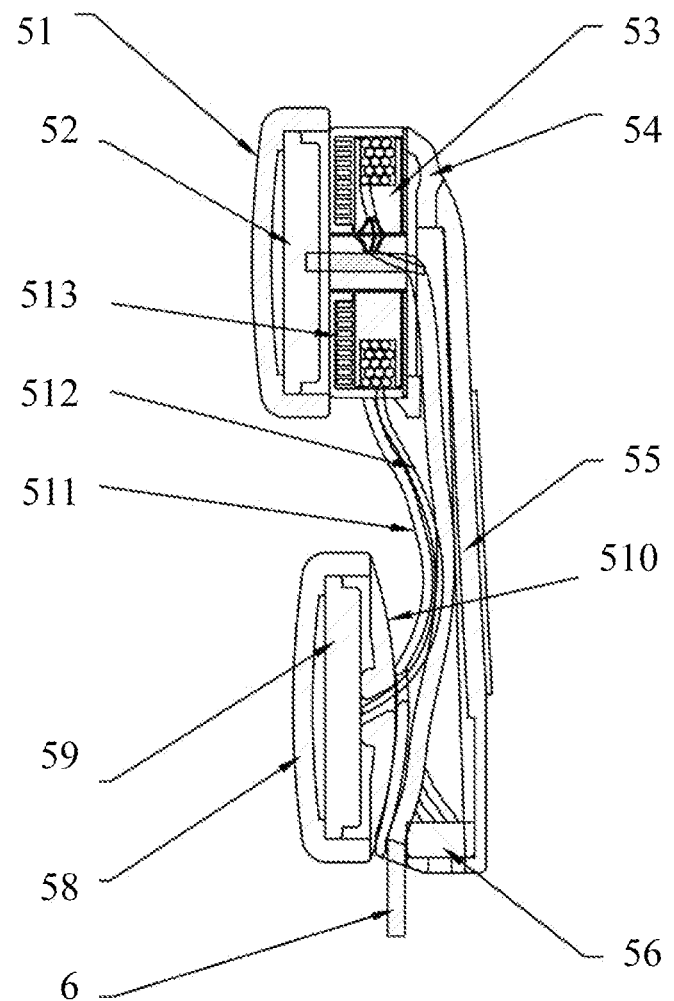
FIG. 16 is a sectional schematic view showing a built-in telescopic earphone structure according to the second embodiment of the present invention.
Figure 17:
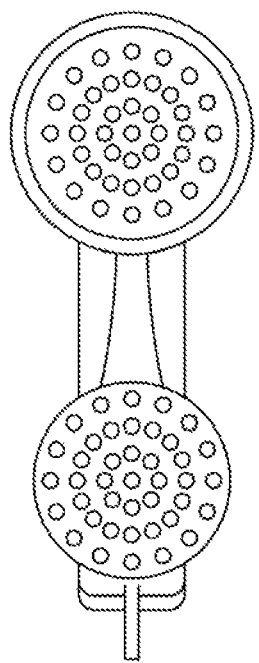
FIG. 17 is a side view showing a built-in telescopic earphone structure according to the second embodiment of the present invention.

FIG. 15 is a schematic view when the earphone line retracting means is applied to the terminal device. The terminal device comprises a mobile phone housing, a built-in telescopic earphone structure 150 arranged within the housing; an earphone line 151, one end of which is connected to the built-in telescopic earphone structure and the other end of which is connected to an audio processing chip of the mobile phone through a signal wire from the signal communication means in the earphone line retracting means; and an earphone line retracting means 152 arranged within the housing for winding the earphone line.

Figure 14:
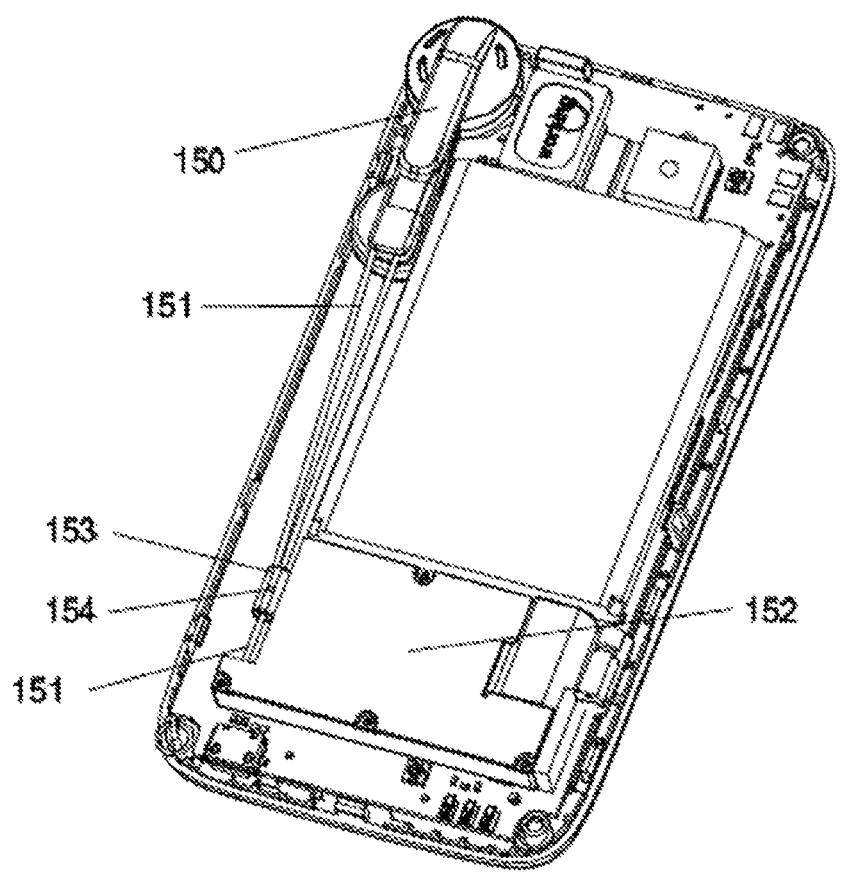
FIG. 14 is a schematic view when the earphone line retracting means is applied to a terminal device according to the first embodiment of the present invention.

The earphone line retracting means 152, the earphone line 151 (a signal earphone line or double earphone lines), a joint 153, a transmitter 154 and double earphones 150 can be directly arranged within the housing of the terminal device (as shown in FIG. 14). The joint 153 can convert the single earphone line to double earphone lines of the earphone line 151. If the double earphone lines are not sufficiently long, the single earphone line can be wound on the earphone rod for several circles (as shown in FIG. 10) so as to increase the length of the earphone line.

Embodiment 2

FIGS. 15-18 are schematic views showing a built-in telescopic earphone structure according to the second embodiment of the present invention.

The built-in telescopic earphone structure comprises a parent-earphone assembly and a child-earphone assembly. The parent-earphone assembly comprises a parent-earphone receiver 52, and a first earphone line retracting means 53 for winding a child-earphone line 512. The child-earphone assembly comprises a child-earphone receiver 59. The parent-earphone receiver 52 is connected to a parent-earphone line 6. One end of the child-earphone line 512 is connected to the parent-earphone line 6 through a first signal connection unit 5106, and the other end is connected to the child-earphone receiver 59.

The parent-earphone assembly comprises a parent-earphone front cover 51, a parent-earphone rear cover 54, the parent-earphone receiver 52 arranged between the parent-earphone front cover 51 and the parent-earphone rear cover 54, and further includes the first earphone line retracting means 53 arranged between the parent-earphone receiver 52 and the parent-earphone rear cover 54 for winding the child-earphone line. The child-earphone assembly comprises a child-earphone front cover 58, a child-earphone rear cover 510, and the child-earphone receiver 59 arranged between the child-earphone front cover 58 and the child-earphone rear cover 510.

The parent-earphone receiver 52 is connected to the parent-earphone line 6. One end of the child-earphone line 512 is connected to the parent earphone line 6 through the first signal connection unit 5106, and the other end is connected to the child-earphone receiver 59.

The parent-earphone assembly further comprises a parent-earphone rod 55 arranged on the parent-earphone rear cover 54, and the child-earphone assembly is clamped to the parent-earphone rod 55 through a buckle 516.

When only one earphone (the parent-earphone) needs to be used, the child-earphone line 512 is retracted in the first earphone line retracting means 53 of the parent-earphone assembly, and the child-earphone assembly is clamped to the parent-earphone rod 55 through the buckle 516. At this time, the other end is clamped at 516 of the parent-earphone rod, thus the parent-earphone assembly is integrally formed with the child-earphone assembly (as shown in FIG. 1) apparently. When double earphones are required, the child-earphone line 512 may be drawn from the first earphone line retracting means 53 of the parent-earphone assembly, and then the child-earphone is put on the other ear so as to obtain the dual-channel or stereo output.

The child-earphone rear cover 510 of the child-earphone assembly may also be provided with a child-earphone rod 511. When the child-earphone assembly is not needed, the child-earphone rod 511 may be inserted into an insert opening 515 of the parent-earphone assembly, so that the parent-earphone assembly is formed integrally with the child-earphone assembly apparently.

In addition, the built-in telescopic earphone structure further comprises a transmitter 56 arranged on the parent-earphone rod 55 and connected to the parent-earphone line 6. The parent-earphone assembly may further be provided with a switch 514 for controlling the second earphone line retracting means.

It is to be indicated that, in order to achieve a better effect, the child-earphone line 512 of the present invention may be thinner and shorter than the parent-earphone line 6. For example, the child-earphone line 512 of merely 30-40 centimetres is required. Thus, the first earphone line retracting means 53 for retracting the child-earphone line 512 may be designed with a miniature size. The parent-earphone line 6 usually has a length of 1 meter or longer, and a diameter larger than that of the child-earphone line 512, thus the second earphone line retracting means for retracting the parent-earphone line 6 is bigger than the first earphone line retracting means 53. However, the first earphone line retracting means 53 and the second earphone line retracting means are substantially constructed in the same way, and there is no obvious difference therebetween. That is, they may be replaced with each other, and both can be driven by a spring or a micromotor.

In addition, the child-earphone line 512 may comprise 2 signal lines, and the parent-earphone line 6 may comprise 4 or more signal lines. The size and length of the child-earphone line 512 and the parent-earphone line 6, and the number of the signal lines are not defined in present invention, and the range of the present invention is not limited to the preferred technical solutions.

Figure 18:
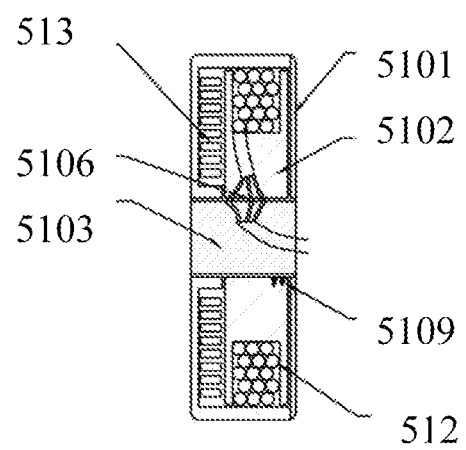
FIG. 18 is a sectional view showing a first earphone line retracting means in the built-in telescopic earphone structure according to the second embodiment of the present invention.
Figure 19:
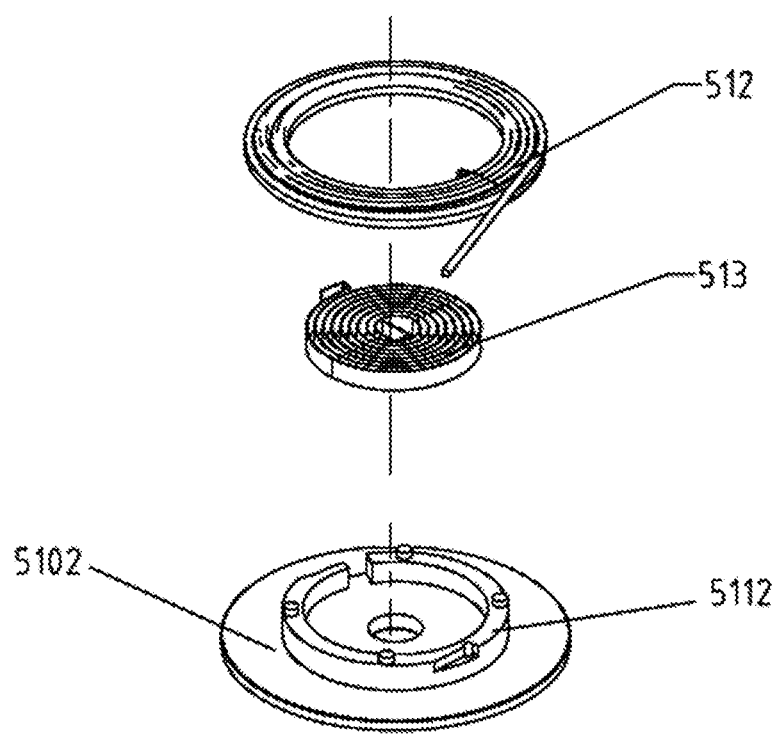
FIG. 19 is a schematic view showing a first earphone line retracting means in the built-in telescopic earphone structure according to the second embodiment of the present invention.

Referring to FIGS. 18 and 19, the first earphone line retracting means 53 comprises a winding reel 5102 arranged on a main shaft 5103, an annular flange 5112 arranged on the winding reel 5102, and a torsion spring 513 arranged within the annular flange 5112. An outer end of the torsion spring 513 is fixedly connected to the annular flange 5112, and an inner end thereof is fixedly connected to the main shaft 5103. The child-earphone line 512 wound on the winding reel 5102 is connected to the parent-earphone line 6 through a first signal connection unit 5106.

The first earphone line retracting means 53 is further provided with a braking means 5109 for controlling rotation of the winding reel 5102, and a housing 5101.

Preferably, the main shaft 5103 is a hollow, circular shaft. The parent-earphone line 6 passes through the circular shaft and connects with the parent-earphone receiver 52, and a signal line is branched therefrom to be connected with the child-earphone line 512 through the first signal connection unit 5106.

Referring to FIG. 19, in the first earphone line retracting means 53, the spring and the winding reel 5102 are arranged in an inside-outside manner, and in the other embodiments of the present invention, they may also be arranged in a left-right manner (as shown in FIG. 18) or in any other arrangements, which are not defined in the present invention.

It is to be indicated that, apart from the above-mentioned structure, the first earphone line retracting means 53 may also use the structure of the second earphone line retracting means described below. In other words, in the present invention the first earphone line retracting means 53 has substantially the same structure as the second earphone line retracting means, and they can be replaced with each other.

In another embodiment of the present invention, the built-in telescopic earphone structure further comprises the second earphone line retracting means.

Figure 20:
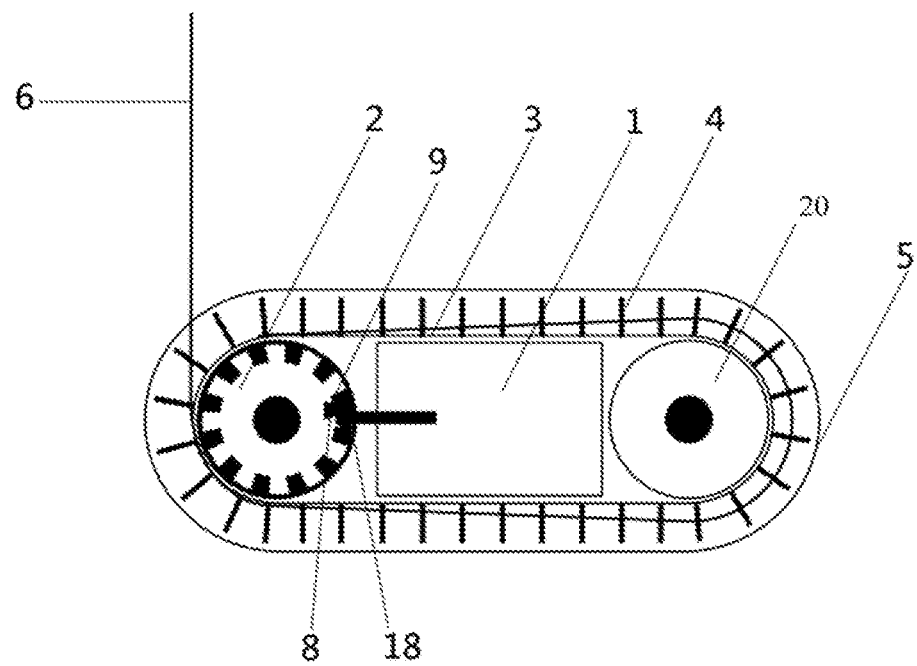
FIG. 20 is a schematic sectional view showing the structure of the second earphone line retracting means according to the second embodiment of the present invention.

FIG. 20 is a sectional view of the first embodiment showing the second earphone line retracting means according to the second embodiment of the present invention. The second earphone line retracting means comprises a drive system 1, a drive wheel 2, a support wheel 20 and a winding loop 3.

The drive system 1 may be a micromotor, a spring or any other drive means capable of supplying power. In this embodiment, the drive system 1 is preferably a micromotor.

The drive wheel 2 is arranged at one side of the drive system 1 and driven by the drive system 1. The support wheel 20 is arranged at the other side of the drive system 1. The winding loop 3 surrounds the drive wheel 2 and the support wheel 20 for winding the parent-earphone line 6. The parent-earphone line 6 wound on the winding loop 3 is connected to an external signal through the second signal connection unit. The drive wheel 2 rotates the support wheel 20 through the winding loop 3 so that the parent-earphone line 6 is wound on the winding loop 3 to retract the earphone line.

The second earphone line retracting means further comprises a clutch means 8 arranged between the drive system 1 and the drive wheel 2. The drive system 1 drives the drive wheel 2 through the clutch means 8, and the drive system 1 is separated from the drive wheel 2 when the drive wheel 2 is rotated by releasing the parent-earphone line 6.

In this embodiment, when a retracting operation of the parent-earphone line 6 is performed, the drive system 1 (e.g., a micromotor) operates to drive the drive wheel 2 through the clutch means 8. The drive wheel 2 rotates the support wheel 20 through the winding loop 3, so that the parent-earphone line 6, one end of which is fixed onto the winding loop 3, can be wound on the winding loop 3. When a releasing operation of the parent-earphone line 6 is performed (i.e., when the user draws out the parent-earphone line 6), the parent-earphone line 6 rotates the drive wheel 2, the winding loop 3 and the support wheel 20. At this time, the drive system 1 and the drive wheel 2 are separated from each other through the clutch means 8 so as to reduce the resistance to drawing the earphone line, and the drive system 1 (e.g., a micromotor) will not be affected. Meanwhile, when the retracting operation of the parent-earphone line 6 is completed or the resistance to retracting the earphone line exceeds a preset value, the clutch means 8 can cause the drive wheel 2 and the drive system 1 to skid with each other, or separate the drive system 1 from the drive wheel 2, so as to race the drive system 1 such as a micromotor, and thereby to protect the micromotor from being damaged.

Figure 21:
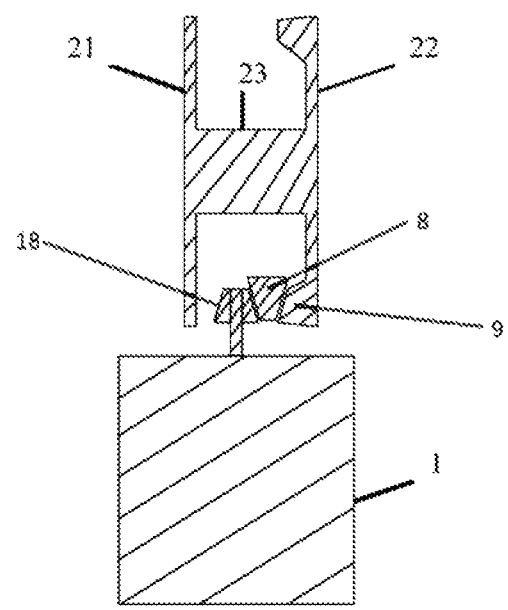
FIG. 21 is a schematic view showing the relationship among a drive system, a clutch means and a drive wheel in the second earphone line retracting means according to the second embodiment of the present invention.

Referring to FIG. 21, the clutch means 8 is preferably a frustum gear. Understandably, it may also be a conical gear, a cylindrical gear or any other types of clutch means 8, which are not defined in the present invention.

The drive wheel 2 comprises a first circular side sheet 22 and a second circular side sheet 21, which are fixed through a main shaft 23. As shown in FIG. 21, an inner side surface of the first circular side sheet 22 is provided with a plurality of gears 9 arranged around the main shaft 23 in the circumference manner. The micromotor is engaged with the frustum gear (the clutch means 8) through a gear 18 arranged on the main shaft of the micromotor, and the frustum gear is engaged with the gears 9 on the drive wheel 2, so that the drive system 1 drives the drive wheel 2 through the frustum gear.

If the clutch means 8 is a gear, the gear arranged on the main shaft of the micromotor and the gears 9 arranged on the drive wheel 2 are fitted to the gear as the clutch means 8. If the clutch means 8 is a frustum gear, the gear arranged on the main shaft of the micromotor is also a frustum gear, and they are meshed with each other. If the clutch means 8 is a conical gear, the gear arranged on the main shaft of the micromotor may also be a conical gear. Thus, when the micromotor is operating, the gear on the main shaft of the micromotor is tightly engaged with the gear as the clutch means 8, and the gear as the clutch means 8 is then tightly engaged with the gears 9 of the drive wheel 2, so as to drive the drive wheel 2 rotate. When the drive wheel 2 is rotated by releasing the parent-earphone line 6, the gear as the clutch means 8 is disengaged and no longer engaged with the gears of the drive wheel 2 and the micromotor, so that the parent-earphone line 6 can be drawn out easily. Moreover, when the drive wheel 2 is rotating, it will not rotate the micromotor, thus there will be no adverse effect on the micromotor.

The second earphone line retracting means further comprises an ellipse housing 5. A side wall of the housing 5 is provided with an opening, through which the parent-earphone line 6 extends out of the housing 5.

Due to the drive system 1, the drive wheel 2 and the support wheel 20, the second earphone line retracting means has an ellipse appearance so as to minimize the size and to wind much longer parent-earphone line 6.

Figure 22:
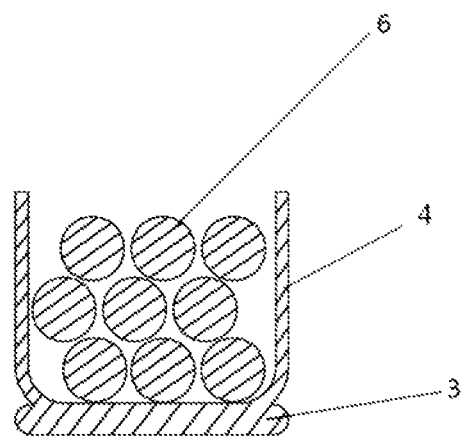
FIG. 22 is a schematic view showing the cross sections of a winding loop and U-shaped line grooves provided on the winding loop in the second earphone retracting means according to the second embodiment of the present invention.

Referring to FIG. 22, in this embodiment of the present invention, the winding loop 3 may be a belt loop or a pedrail structure made of the materials such as plastics, metals or metalloids. To fix the wound parent-earphone line 6 in a better manner, a plurality of U-shaped line grooves 4 are provided on the winding loop 3 at regular intervals (preferably 2 to 8 mm). The plurality of U-shaped line grooves 4 are arranged together to form a winding line groove, in which the parent-earphone line 6 is wound when retracted.

Figure 23:
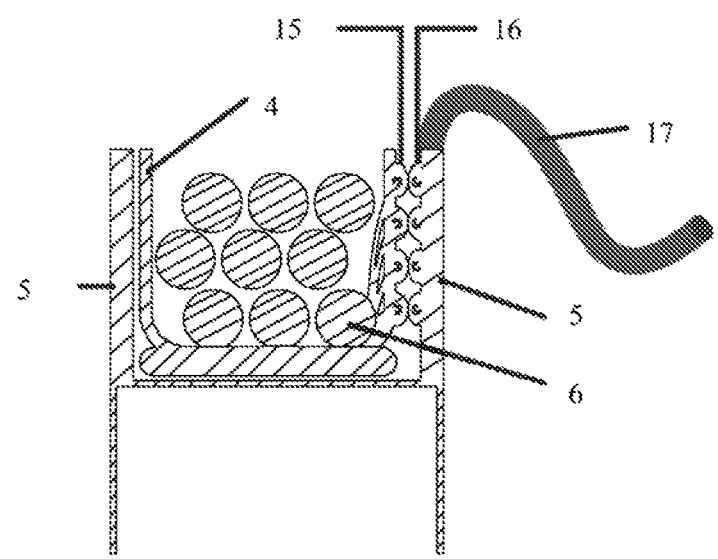
FIG. 23 is a schematic view showing the relationship among the U-shaped line grooves, a signal connection means and a housing in the second earphone line retracting means according to the second embodiment of the present invention.

Referring to FIG. 23, the second signal connection unit comprises a plurality of signal communication elastic sheets 15 arranged outside the U-shaped line grooves 4 and connected to the parent-earphone line 6 through an earphone signal line, and a plurality of signal communication tracks 16 arranged on an inner wall of the housing 5 and capable of being in contact with the signal communication elastic sheets 15. The signal communication tracks 16 consist of annular conductive metal sheets and are connected to a signal from a main board of the external terminal by the signal line.

An end of the parent-earphone line 6 is fixed to the U-shaped line groove 4, and several earphone signal lines are branched therefrom to be connected with the signal communication elastic sheets 15.

It is to be indicated that, the signal communication elastic sheets 15 are provided at the U-shaped line groove 4 to which the end of the earphone line is fixed, and the signal communication tracks 16 need to surround the inner side surface of the housing 5 for a whole circle. When the signal communication elastic sheets rotate along with the U-shaped line groove 4, they are in slip friction contact with the signal communication tracks 16 so as to ensure a communication state at any time.

Figure 24:
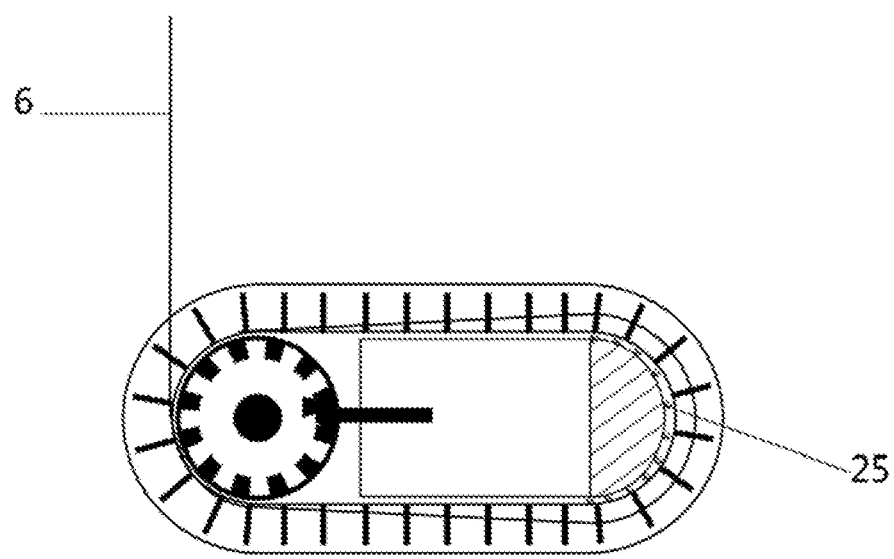
FIG. 24 is a sectional view showing the second earphone line retracting means according to the second embodiment of the present invention.

In this embodiment, the support wheel 20 is a circular article. In another embodiment, referring to FIG. 24, the support wheel 20 is a plurality of balls or rollers 25 or any other rollable or slidable articles arranged in a semicircular manner. As compared with the circular article as the support wheel 20, the use of balls or rollers can reduce the size of the earphone line retracting means in a better manner.

In this embodiment, due to the drive system 1, the drive wheel 2 and the support 20 in the second earphone line retracting means, the length of the parent-earphone line 6 to be wound is increased remarkably, and the size of the earphone line retracting means is reduced. The second earphone line retracting means with reduced size can be fitted to the mobile terminals of different types in a better manner.

In addition, a speed shift means is automatically formed by the interaction between a main shaft gear of the drive system 1 as well as an inner side gear of the drive wheel 2 and the winding loop 3. Thus, the torsion of the drive system 1 such as a micromotor and the length of the parent-earphone line 6 to be wound will be increased remarkably.

Figure 25:
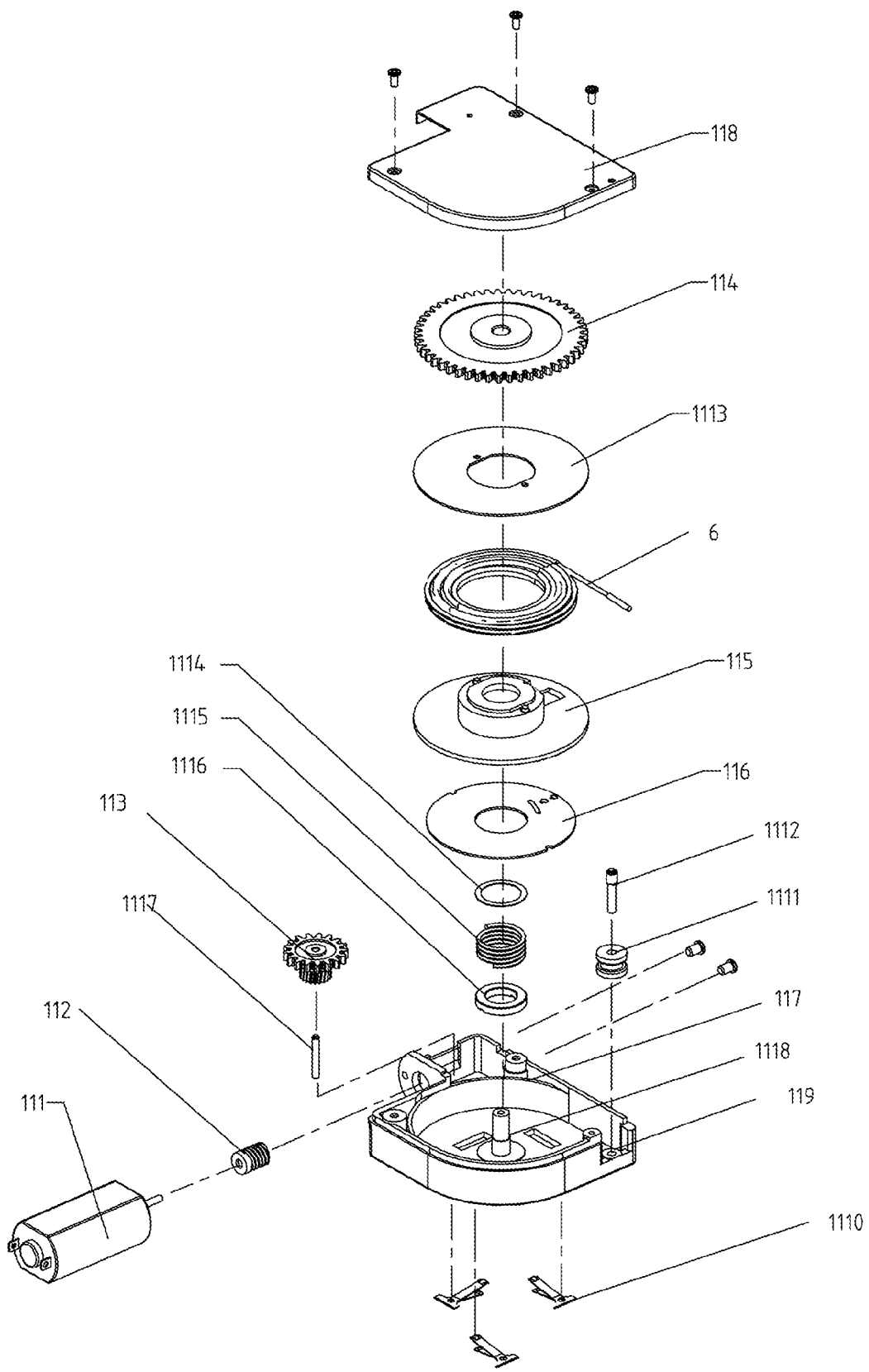
FIG. 25 is an exploded view showing the structure of the second earphone line retracting means according to the second embodiment of the present invention.

FIG. 25 is an exploded view showing the second earphone line retracting means according to the second embodiment of the present invention. The second earphone line retracting means comprises an electric motor 111, a speed shift means, a winding reel 115, a second signal connection unit 116 and a housing. When the second earphone line retracting means is arranged within the other terminals or used as the first earphone line retracting means 53, the housing may be omitted.

The electric motor 111 is used for supplying driving force to the winding reel 115. The speed shift means rotates the winding reel 115, and the electric motor 111 is supplied with electric power from an external power supply and controlled by an external switch. The external power supply and the external switch are not shown in the drawings.

In another embodiment of the second earphone line retracting means of the present invention, the speed shift means comprises a screw 112 connected to a drive shaft of the electric motor 111, a first gear 113 and a second gear 114. The first gear 113 is a two-stage gear, one stage of which is vertically meshed with the screw 112, and the other stage of which is engaged with the second gear 114. The second gear 114 drives the winding reel 115 to retract the earphone line.

The housing comprises an upper housing 118 and a base 117. The electric motor 11 is arranged parallel to the bottom of the base 117. The first gear 113 is arranged perpendicular to the bottom of the base 117 through a gear shaft 1117. The base 117 is provided with a main shaft 1118 perpendicular to the bottom. The second gear 114, the winding reel 115 and the second signal connection unit 116 are provided on the main shaft 1118. Such an arrangement can minimize the size of the earphone line retracting means.

It is to be indicated that, the two gears as shown in FIG. 25 are merely used to illustrate this embodiment conveniently, and the number of the gears is not defined in the present invention. A person skilled in the art may determine the number and size of the gears, and the location relationship between the electric motor 111 and the winding reel 115 according to the practical need. For example, three or more gears may be provided, and the sizes of the gears are set in proportion so as to form a speed shift means for controlling the rotation speed of the winding reel 115 driven by the motor 111.

In another embodiment of the second earphone line retracting means, the electric motor 111 may be arranged parallel to the main shaft 1118. At this time, the speed shift means may comprise at least one gear. The gear is provided on the main shaft 1118 and engaged with the screw 112, and the electric motor 111 drives the winding reel 115 rotate. Of course, a person skilled in the art may also determine the number and size of the gears, and the location relationship between the electric motor 111 and the winding reel 115 according to the practical need. For example, two or more gears may be provided, and the sizes of the gears are set in proportion so as to form a speed shift means for controlling the rotation speed of the winding reel 115 driven by the electric motor 111. The difference between this embodiment and the first embodiment lies in that the electric motor 111 is arranged perpendicularly, thus the size of the earphone line retracting means may be increased.

The side wall of the housing is provided with an opening 119, in which a pulley wheel 1111 is provided. The pulley wheel 1111 is arranged on the base 117 through a pulley wheel shaft 1112, and the parent-earphone line 6 extends out of the housing through the pulley wheel 1111, so as to reduce the friction between the parent-earphone line 6 and the housing and to protect the parent-earphone line 6 in a better manner.

The winding reel 115 may also be provided with a baffle 1113 for separating the second gear 114 from the parent-earphone line 6 on the winding reel 115. Thus, the parent-earphone line 6 may be wound on the winding reel 115 in a better manner so as to protect the parent-earphone line 6.

If the electric motor 111 directly rotates the winding reel 115 to retract the earphone line, because the electric motor 111 rotates at as high as thousands of rpm (rounds per minute) to tens of thousands of rpm, the parent-earphone line 6 is retracted instantly by the winding reel 115, so that the too high speed of the retraction of the earphone line may cause damage to the device and the user. By contrast, in the present invention, there are a plurality of gears which transmit with each other, thus the rotate speed of the winding reel 115 is reduced to a proper and safe range and at the same time torque of the electric motor 111 is increased.

Figure 26:
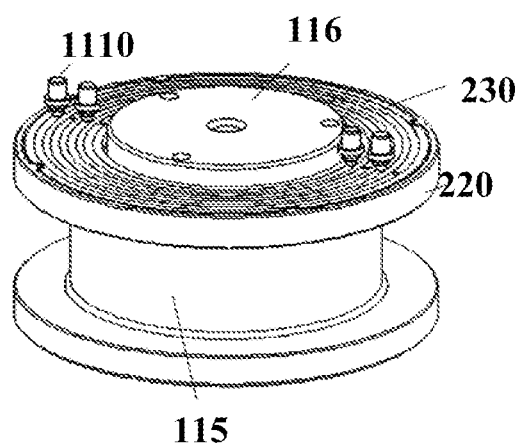
FIG. 26 is a view showing the structure of a second signal connection unit in the second earphone line retracting means as shown in FIG. 25.

FIG. 26 is a view showing the second signal connection unit 116 in the second earphone line retracting means.

The second signal connection unit 116 comprises a circuit board 220 and a plurality of annular conductive sheets 230. The plurality of annular conductive sheets 230 are connected to one end of the parent-earphone line 6, and to an external signal line (a signal line inside another terminal when the second earphone line retracting means is provided in the terminal) through a spring feeler 1110 and a lead wire (not shown). By using this structure, when the winding reel 115 is rotated to wind or unwind the parent-earphone line 6, one end of the parent-earphone line 6 is in communication with an external signal through the annular conductive sheets 230 and the spring feeler 1110 all the time, thus communication and effectiveness of the signal will be maintained. Of course, the second signal connection unit 116 may also be a wireless signal connection unit.

In another embodiment, the second earphone line retracting means further comprises a clutch means having a compression spring 1115 arranged on the main shaft. One end of the compression spring 1115 is in contact with the bottom of the base through a pushing ring 1116, and the other end is in contact with the second gear 114 through a gasket 1114.

Understandably, the compression spring 1115 is merely one of the clutch means, and the clutch means may be achieved by the other methods.

The electric motor 111 drives the winding reel 115 to retract the earphone line through the screw 112, the first gear 113 and the second gear 114. When the retraction of the earphone line is completed, usually the user will not turn off the power supply of the electric motor 111 in time, thus the electric motor 111 will continue to operate. At this time, the voltage and torsion of the electric motor 111 increases, and the clutch means causes the second gear 114 in contact with the compression spring 1115 to race while the winding reel 115 is not rotating, thus the components such as the electric motor 111 and the parent-earphone line 6 will be protected effectively.

In addition, the present invention further provides a mobile terminal comprising, apart from the main body, the built-in telescopic earphone structure as described above. The main body may be any electronic device using the earphone, such as MP3, MP4, MP5, a computer, a handheld game machine or a mobile phone.

According to the present invention, a double earphone structure including a parent-earphone and a child-earphone is provided, and an earphone line retracting means is provided on the parent-earphone to retract the child-earphone line 512. Such a structure may facilitate not only the retraction of the parent-earphone line (a single line), but also the separation of a child-earphone from the parent-earphone so as to achieve dual-channel output effection. When dual-channel or stereo output is undesired, merely the parent-earphone is used, and when dual-channel or stereo output is desired, the child-earphone and the child-earphone line 512 can be drawn out of the parent-earphone, and the child-earphone and the parent-earphone are put on the two ears respectively so as to receive audio message.

The above embodiments are merely preferred ones of the present invention, and it shall be indicated that, improvements and modifications may also be made by a person skilled in the art without departing from the principle of the present invention, and these improvements and modifications shall also be considered as within the range of the present invention.

What is claimed is:

1. A built-in telescopic earphone structure, characterized by comprising:
   a housing having a containing space;
   an earphone arranged within the containing space and having an earphone assembly and an earphone line or earphone lines;
   a connection means for connecting the earphone with a terminal device and transmitting signals; and
   an earphone line retracting means arranged within the containing space for retracting or releasing the earphone line;
   the earphone comprises:
      an earphone rod having a mounting surface;
      a first connection part; and
      a first earphone assembly which is connected to the earphone rod via the first connection part in such a manner that its height is variable relative to the mounting surface;
   the first connection part is an elastic sheet, one end of which is fixedly connected to the mounting surface, and the other end of which is fixedly connected to the bottom of the first earphone assembly.

2. The built-in telescopic earphone structure according to claim 1, characterized in that the housing comprises a base plate made of hard materials, and a side wall and an upper edge made of soft materials,
   wherein the base plate, the side wall and the upper edge are formed integrally.

3. The built-in telescopic earphone structure according to claim 1, characterized in that the earphone assembly comprises a parent-earphone assembly, a child-earphone assembly and an earphone rod,
   wherein the parent-earphone assembly and the child-earphone assembly are both arranged on the earphone rod, and a switch for retracting the earphone line is further provided on the earphone rod.

4. The built-in telescopic earphone structure according to claim 1, characterized in that it further comprises a winding device for winding the earphone line,
   wherein the winding device comprises a plurality of rollers and a belt loop arranged on the plurality of rollers.

5. The built-in telescopic earphone structure according to claim 4, characterized in that it further comprises a battery arranged within the containing space for supplying electric power to the earphone line retracting means,
   wherein the plurality of rollers is arranged at a side of the battery.

6. The built-in telescopic earphone structure according to claim 5, characterized in that it further comprises a chip processor as the connection means,
   wherein the chip processor is connected to the battery through a lead wire so as to control charging and discharging of the battery.

7. The built-in telescopic earphone structure according to claim 6, characterized in that the housing is provided with a socket for charging, to which the chip processor is connected through a lead wire,
   wherein the built-in telescopic earphone structure further comprises a conversion plug assembly, one end of which is connected to the chip processor, and the other end of which is connected to the terminal device, and
   the chip processor is used to enable the battery and a battery of the terminal device to share the power supply and/or the socket for charging.

8. The built-in telescopic earphone structure according to claim 7, characterized in that the conversion plug assembly comprises a lead wire and two plugs at both ends,
   wherein the plug at one end is inserted into the chip processor, and the plug at the other end is inserted into the terminal device, and
   the chip processor is used to communicate the built-in telescopic earphone structure with the terminal device.

9. The built-in telescopic earphone structure according to claim 8, characterized in that it is provided with a plurality of the conversion plug assemblies of different types.

10. The built-in telescopic earphone structure according to claim 9, characterized in that the earphone line retracting means comprises a drive means, a winding reel for winding the earphone line, a speed shift means, a clutch, a signal communication means connected to the earphone line, and a signal line extracted therefrom, which are enclosed within the housing to form an assembly.

11. The built-in telescopic earphone structure according to claim 10, characterized in that the drive means of the earphone line retracting means drives the speed shift means rotate, and the speed shift means in turn is engaged or disengaged with the winding reel by the clutch to drive the winding reel rotate to retract or release the earphone line.

12. The built-in telescopic earphone structure according to claim 11, characterized in that the battery is connected to the drive means in the earphone line retracting means via a lead wire.

13. The built-in telescopic earphone structure according to claim 12, characterized in that the earphone line retracting means further comprises a line-pressing plate for the convenience of winding the earphone line regularly.

14. The built-in telescopic earphone structure according to claim 1, characterized in that the earphone line comprises bulletproof wires, insulated conductive wires, an earphone line skin, and a plurality of conductors,
    wherein the plurality of conductors consist of several insulated conductive wires,
    the insulated conductive wires are arranged in a parallel manner with each other, and wound to the bulletproof wires in a spiral fashion,
    the earphone line skin is attached to and encloses the surface of the insulated conductive wires to form an ultrathin, flexible and wear-resistant skin, and
    the conductors are located at both ends of the earphone line and connected to the signal communication means of the earphone line retracting means and an O/I port of the earphone respectively when in use.

15. The built-in telescopic earphone structure according to claim 1, characterized in that it further comprises a second earphone assembly having a second connection part,
    wherein the earphone rod has a receiving part, and the second earphone assembly is detachably connected to the earphone rod via the second connection part and the receiving part.

16. The built-in telescopic earphone structure according to claim 15, characterized in that double earphone lines which are connected to the first earphone assembly and the second earphone assembly are converted to a single earphone line via a joint,
    wherein a transmitter is provided at the joint.

17. The built-in telescopic earphone structure according to claim 15, characterized in that it further comprises an winding line groove formed surround the earphone rod for winding a second earphone line connected to the second earphone assembly.

18. A terminal device, comprising:
    a main body; and
    the built-in telescopic earphone structure according to any one of claims 1 to 14 or 15 to 17,
    wherein the connection means in the built-in telescopic earphone structure is used to achieve the connection and signal transmission between the earphone and the main body.

19. The terminal device according to claim 18, characterized in that the terminal device is a mobile phone, a panel computer, a laptop computer, a desktop computer, a television, a hand-held computer, a telephone, a personal audiovisual device, a digital player, a navigation device or a game machine.

20. A built-in telescopic earphone structure, characterized in that it comprises a parent-earphone assembly and a child-earphone assembly;
    wherein the parent-earphone assembly including a parent-earphone receiver and a first earphone line retracting means for retracting a child-earphone line;
    wherein the child-earphone assembly including a child-earphone receiver,
    wherein the parent-earphone receiver is connected to the parent-earphone line, one end of the child-earphone line is connected to the parent-earphone line via a first signal connection unit, and the other end of the child-earphone line is connected to the child-earphone receiver; and
    a second earphone line retracting means having an electric motor for providing driving force,
    wherein the electric motor drives the winding reel arranged on the main shaft via a seed shift means, and the parent-earphone line wound on the winding reel is connected to an external signal via a second signal connection unit.

21. The built-in telescopic earphone structure according to claim 20, characterized in that the parent-earphone assembly further comprises a parent-earphone front cover and a parent-earphone rear cover, wherein the parent-earphone receiver is arranged between the parent-earphone front cover and the parent-earphone rear cover, and the first earphone line retracting means is arranged between the parent-earphone receiver and the parent-earphone rear cover, and
    the child-earphone assembly further comprises a child-earphone front cover and a child-earphone rear cover, and the child-earphone receiver is arranged between the child-earphone front cover and the child-earphone rear cover.

22. The built-in telescopic earphone structure according to claim 21, characterized in that the parent-earphone assembly further comprises a parent-earphone rod arranged on the parent-earphone rear cover,
    wherein the child-earphone assembly can be snapped to the parent-earphone rod via a buckle.

23. The built-in telescopic earphone structure according to claim 22, characterized in that it further comprises a transmitter which is arranged on the parent-earphone rod and connected to the parent-earphone line.

24. The built-in telescopic earphone structure according to claim 20, characterized in that the first earphone line retracting means comprises a winding reel which is arranged on a main shaft,
    wherein the winding reel is provided with a circular flange,
    inside the circular flange is provided with a torsion spring, an outer end of which is fixedly arranged on the circular flange and an inner end of which is fixedly arranged on the main shaft for rotating the winding reel to retract the child-earphone line, and
    the child-earphone line wound on the winding reel is connected to the parent-earphone line via the first signal connection unit.

25. The built-in telescopic earphone structure according to claim 24, characterized in that the first earphone line retracting means is further provided with a braking means for controlling rotation of the winding reel,
    wherein the first earphone line retracting means can further be used for a second earphone line retracting means.

26. The built-in telescopic earphone structure according to claim 20, characterized in that the speed shift means comprises
    a screw connected to a drive shaft of the electric motor;
    a first gear which is a two-stage gear and one stage of which is vertically meshed with the screw; and
    a second gear which is arranged on the same main shaft as the winding reel and which is engaged with the other stage of the first gear, wherein the second gear drives the winding reel to retract the parent-earphone line, and the speed shift means further consists of a plurality of multi-stage gears according to different gear ratio.

27. The built-in telescopic earphone structure according to claim 26, characterized in that the second earphone line retracting means further comprises
a shell having an upper shell part and a base, wherein a side wall of the shell is provided with an opening in which a pulley wheel is arranged, the pulley wheel is arranged on the base via a pulley wheel shaft, and the parent-earphone line extends out of the shell via the pulley wheel.

28. The built-in telescopic earphone structure according to claim 27, characterized in that the second earphone line retracting means further comprises a clutch means arranged between the electric motor and the winding reel so as to achieve engagement or disengagement between the electric motor and the winding reel.

29. The built-in telescopic earphone structure according to claim 28, characterized in that the clutch means comprises a compression spring arranged on the main shaft, one end of which is in contact with a bottom surface of the base and the other end of which is in contact with the second gear, wherein engagement or disengagement are effected by means of the difference of force between the compression spring and the speed shift means and force between the compression spring and the winding reel.

30. The built-in telescopic earphone structure according to claim 29, characterized in that the second signal connection unit comprises a circuit board, wherein the circuit board is provided with a plurality of annular conductive sheets which are connected to the parent-earphone line, and to an external signal via a spring feeler and a feeler lead, and the spring feeler is in communication with the conductive sheets.

31. A built-in telescopic earphone structure comprising a parent-earphone assembly and a child-earphone assembly;
wherein the parent-earphone assembly including a parent-earphone including receiver and a first earphone line retracting means for retracting a child-earphone line;
wherein the child-earphone assembly including a child-earphone receiver,
wherein the parent-earphone receiver is connected to the parent-earphone line, one end of the child-ea hone line is connected to the parent-earphone line via a first signal connection unit, and the other end of the child-earphone line is connected to the child-earphone receiver; and
the built-in telescopic earphone structure comprises a second earphone line retracting means including
a drive system;
a drive wheel arranged at one side of the drive system and driven by the drive system,
a support wheel arranged at the other side of the drive system, and
a winding loop surrounding the drive wheel and the support wheel for winding the
parent-earphone line, wherein the parent-earphone line wound on the winding loop is connected to an external signal via the second signal connection unit, and the drive wheel rotates the support wheel via the winding loop so that the parent-earphone line is wound on the winding loop and thereby retracted;
the second earphone line retracting means further comprises
a clutch means arranged between the drive system and the drive wheel, wherein the drive system drives the drive wheel via the clutch means, and the drive system is separated from the drive wheel when the drive wheel is rotated by releasing the parent-earphone line or the retraction of the earphone line is completed.

32. The built-in telescopic earphone structure according to claim 31, characterized in that the drive system is a micromotor, and the clutch means is a frustum gear.

33. The built-in telescopic earphone structure according to claim 32, characterized in that the drive wheel comprises a first circular side sheet and a second circular side sheet which are connected to each other via a main shaft, wherein an inner side of the first circular side sheet is provided with a plurality of gears circumferentially arranged around the main shaft, and the micromotor is engaged or disengaged with the frustum gear via the gears arranged on the main shaft of the micromotor.

34. The built-in telescopic earphone structure according to claim 33, characterized in that the winding loop is provided with an winding line groove formed by a plurality of U-shaped line grooves, and the parent-earphone line is wound within the winding line groove when retracted.

35. The built-in telescopic earphone structure according to claim 34, characterized in that it further comprises an ellipse housing, wherein a side wall of the housing is provided with an opening, through which the parent-earphone line extends out of the housing.

36. The built-in telescopic earphone structure according to claim 35, characterized in that the second signal connection unit comprises,
a plurality of signal communication elastic sheets provided at the outside of the U-shaped line grooves, to which the parent-earphone line is connected; and
a plurality of signal communication tracks which are arranged on an inner wall of the housing and capable of being contacted and communicated with the signal communication elastic sheets, wherein the signal communication tracks consist of annular conductive metal sheets and are connected to signals from a main board of an external terminal via a signal line.

37. The built-in telescopic earphone structure according to claim 36, characterized in that the support wheel consists of a plurality of balls or rollers arranged in a semicircular manner.

38. A terminal device, characterized by comprising:
a main body; and
the built-in telescopic earphone structure according to claim 20,
wherein the connection means in the built-in telescopic earphone structure is used to achieve the connection and signal transmission of the earphone with the main body.

* * * * *